(12) United States Patent
Sugihara et al.

(10) Patent No.: US 7,587,389 B2
(45) Date of Patent: Sep. 8, 2009

(54) QUESTION ANSWERING SYSTEM, DATA SEARCH METHOD, AND COMPUTER PROGRAM

(75) Inventors: Daigo Sugihara, Kanagawa (JP); Hiroshi Masuichi, Ashigarakami-gun (JP); Tomoko Ohkuma, Ashigarakami-gun (JP); Hiroki Yoshimura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 225 days.

(21) Appl. No.: 11/298,855

(22) Filed: Dec. 12, 2005

(65) Prior Publication Data

US 2006/0282414 A1 Dec. 14, 2006

(30) Foreign Application Priority Data

Jun. 10, 2005 (JP) ............... 2005-170424

(51) Int. Cl.
  G06F 17/30 (2006.01)
  G06F 17/27 (2006.01)
(52) U.S. Cl. ............................. 707/3; 704/9
(58) Field of Classification Search ............ 704/1, 704/4–5, 231, 9; 707/3–5
  See application file for complete search history.

(56) References Cited

U.S. PATENT DOCUMENTS

| | | | | |
|---|---|---|---|---|
| 4,965,763 A | * | 10/1990 | Zamora | 704/1 |
| 5,774,845 A | * | 6/1998 | Ando et al. | 704/231 |
| 5,903,858 A | * | 5/1999 | Saraki | 704/4 |
| 5,933,822 A | * | 8/1999 | Braden-Harder et al. | 707/5 |
| 2003/0158723 A1 | | 8/2003 | Masuichi et al. | |
| 2004/0181389 A1 | * | 9/2004 | Bourigault et al. | 704/1 |

FOREIGN PATENT DOCUMENTS

JP 2002-132811 5/2002

OTHER PUBLICATIONS

H. Isozaki., "NTT's Question Answering System for NTCIR QAC2," Working Notes of NTCIR-4 Workshop, pp. 326-332, Jun. 2-4, 2004.
J. L. Vicedo et al., "Importance of Pronominal Anaphora Resolution in Question Answering System," ACL 2000 (with Abstract).

(Continued)

*Primary Examiner*—Hung T Vy
(74) *Attorney, Agent, or Firm*—Oliff & Berridge, PLLC

(57) ABSTRACT

A question answering system includes a question input unit input to a question, a search unit, an anaphoric analysis unit, an information extraction unit and an answer candidate extraction unit. The search unit executes search processing based on the input question. The anaphoric analysis unit executes anaphoric analysis processing on a search result. The information extraction unit extracts sentences, which include expressions having a reference relation therebetween, as reference relation sentences, the reference relation determined by finding relation in an expressions of at least one of a noun phrase, a pronoun, and a zero pronoun between sentences in the search result on a basis of a result of the anaphoric analysis; selects a first candidate sentence from a passage obtained as the search result; and selects a second candidate sentence, which is the reference relation sentence of the first candidate sentence. The answer candidate extraction unit extracts an answer candidate.

7 Claims, 14 Drawing Sheets

OTHER PUBLICATIONS

H. Masuichi et al., "Constructing a practical Japanese Parser based on Lexical Functional Grammar," Natural Language Processing, vol. 10. No. 2, pp. 79-109 (2003) (with English language Abstract).

D. Kawahara et al. "Zero Pronoun Resolution based on Automatically Constructed Case Frames and Structural Preference of Antecedents," Natural Language Processing, vol. 11, No. 3 (2004) (with English language Abstract).

R. Iida et al., "One technique of anaphoric analysis of Japanese-language noun phrase by machine learning," Language Processing Society 10th annual conference (2004).

M. Kay "Chart Generation," In Proceedings of the 34th Annual Meeting of the ACL, pp. 200-204.

W. M. Soon et al., "A Machine Learning Approach to Coreference Resolution of Noun Phrases," Computational Linguistics, vol. 27, No. 4, pp. 521-544, (2001).

M. Butt et al., "The Parallel Grammar Project," In Proceedings of COLING-2002 Workshop on Grammar Engineering and Evaluation, pp. 1-7, (2002).

H. Masuichi, et al "Japanese Parser on the basis of the Lexical-Functional Grammer Formalism and its Evaluation," In Proceedings of The 17th Pacific Asia Conference on Language, Information and Computation (PACLICI 7), pp. 298-309 (2003).

R. M. Kaplan et al., "Lexical-Functional Grammer: A formal system for grammatical representation," The Mental Representation of Grammatical Relations, The MIT Press, Cambridge, MA, pp. 173-281, (1982), Reprinted in Dalrymple, Kaplan, Maxwell, and Zaenen, editors, Formal Issues in Lexical-Functional Grammer, Stanford: Center for the Study of Language and Information, pp. 29-130 (1995).

M. Murata et al.; "An Estimate of Referent of Nouns in Japanese Sentences with Referential Property of Nouns," Natural Language Processing, vol. 3. No. 1, (1996) (with English language Abstract).

* cited by examiner

FIG. 1

Sentence 1: Preparations for the year change period started at the 20th of December In Hata City Castle Ruin Park. (a1)

Sentence 2: In the park, a pine tree was decorated and became a
(a2)
Christmas tree. (c1)
(b1)

Sentence 3: Generally, a fir tree is used as a Christmas tree.

Sentence 4: A giant Christmas tree of Rockefeller Center in New York is world-famous.
(b2)

Sentence 5: However, this tree of the pine tree also has a
(c3)
wonderful appeal and is popular among enthusiasts.

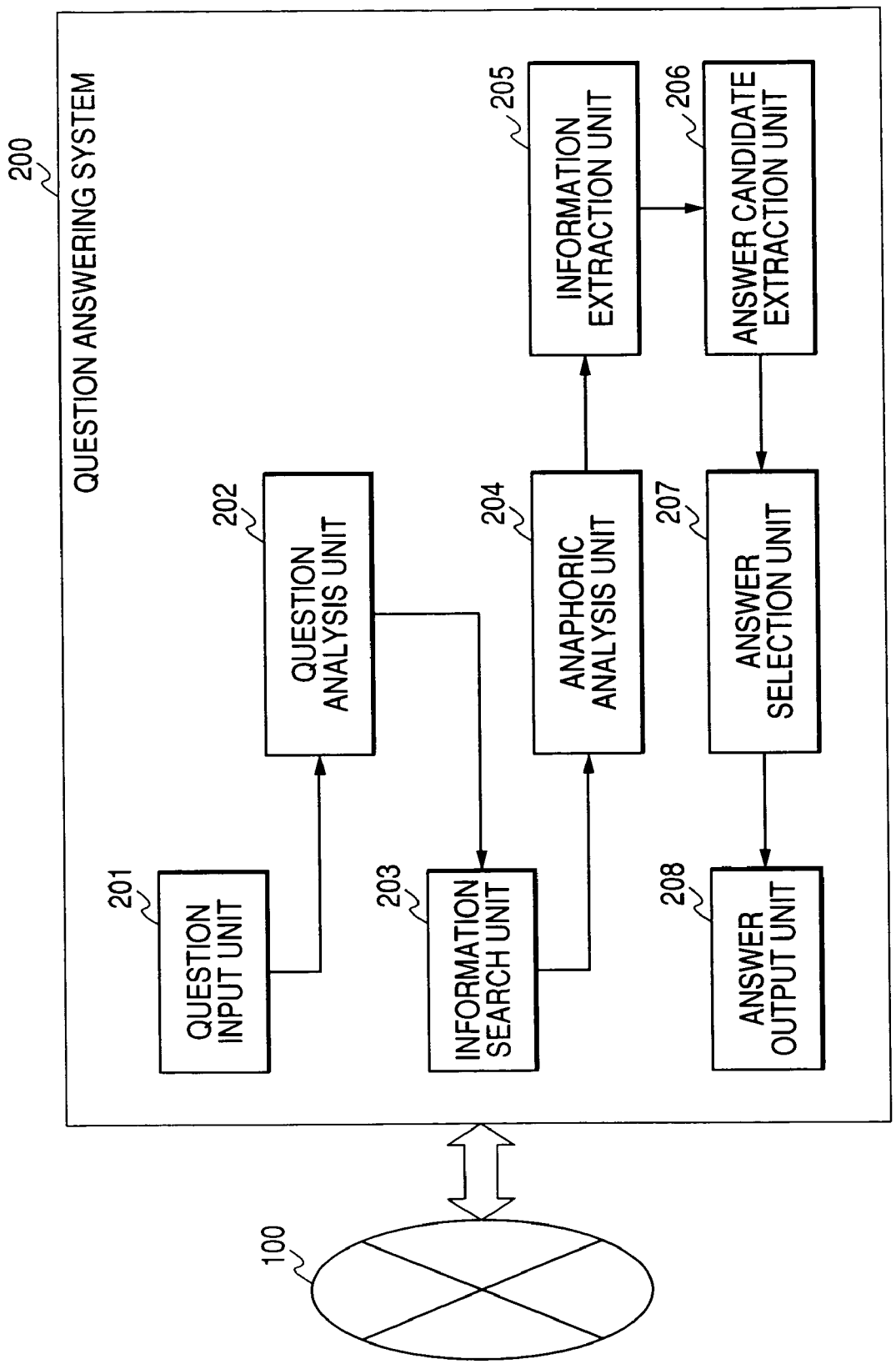

FIG. 4

Sentence 1: Preparations for the year change period started at the 20th of December in Hata City Castle Ruin Park. (a1)

Sentence 2: In the park, a pine tree was decorated and became a Christmas tree. (a2) (c1)
(b1)

Sentence 3: Generally, a fir tree is used as a Christmas tree.

Sentence 4: A giant Christmas tree of Rockefeller Center in New York is world-famous. (b2)

Sentence 5: However, this tree of the pine tree also has a wonderful appeal and is popular among enthusiasts. (c3)

FIG. 5A

Search Keywords: Christmas tree, pine tree, popular, enthusiasts

FIG. 5B Search Result Document

Sentence 1: Preparations for the year change period started at the 20th of December in Hata City Castle Ruin Park.

Sentence 2: In the park, a |pine tree| was decorated and became a |Christmas tree|.

Sentence 3: Generally, a fir tree is used as a Christmas tree.

Sentence 4: A giant Christmas tree of Rockefeller Center in New York is world-famous.

Sentence 5: However, this tree of the |pine tree| also has a wonderful appeal and is |popular| among |enthusiasts|.

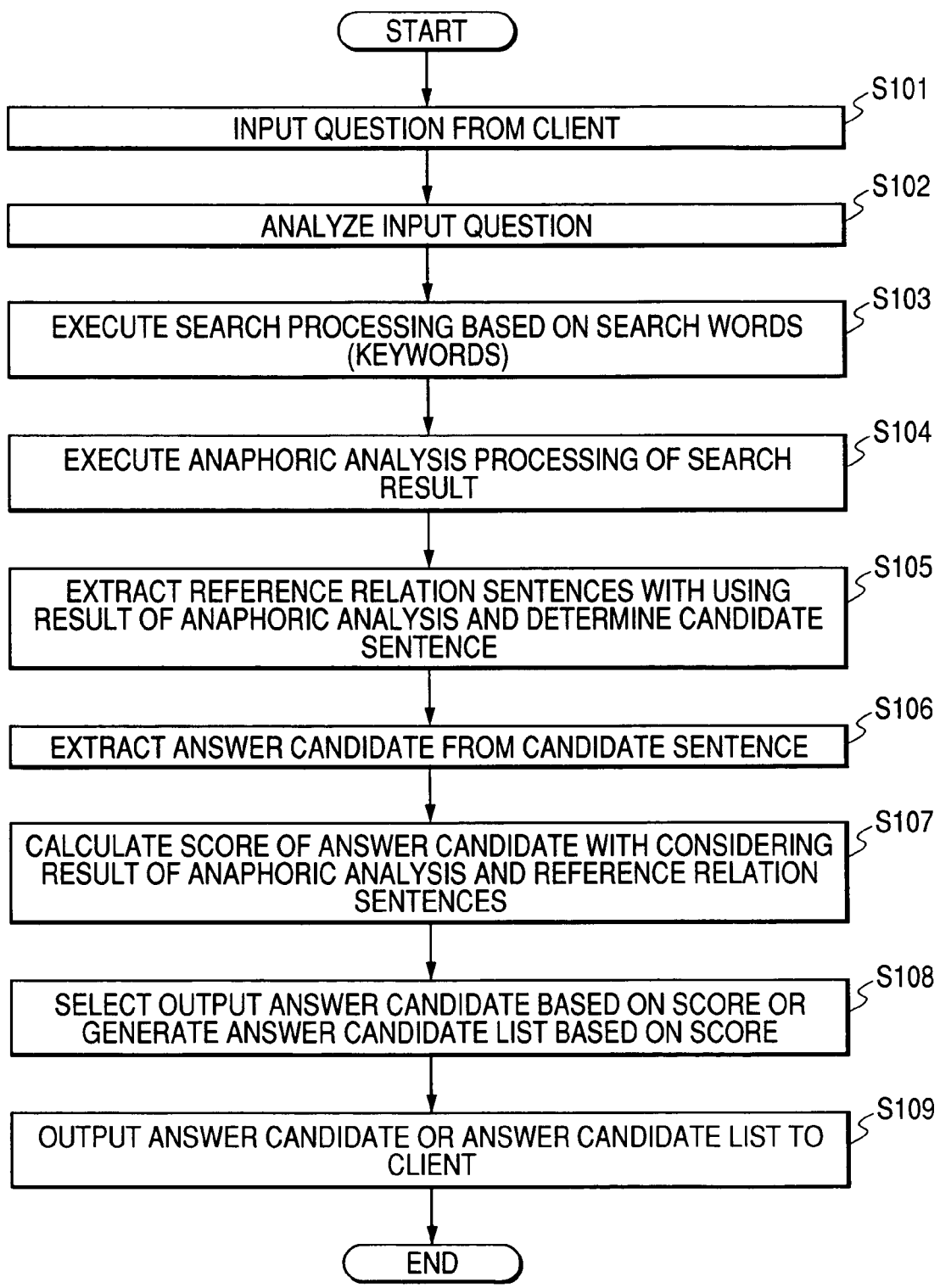

Preparations for the year change period started at the 20th of December in Hata City Castle Ruin Park.

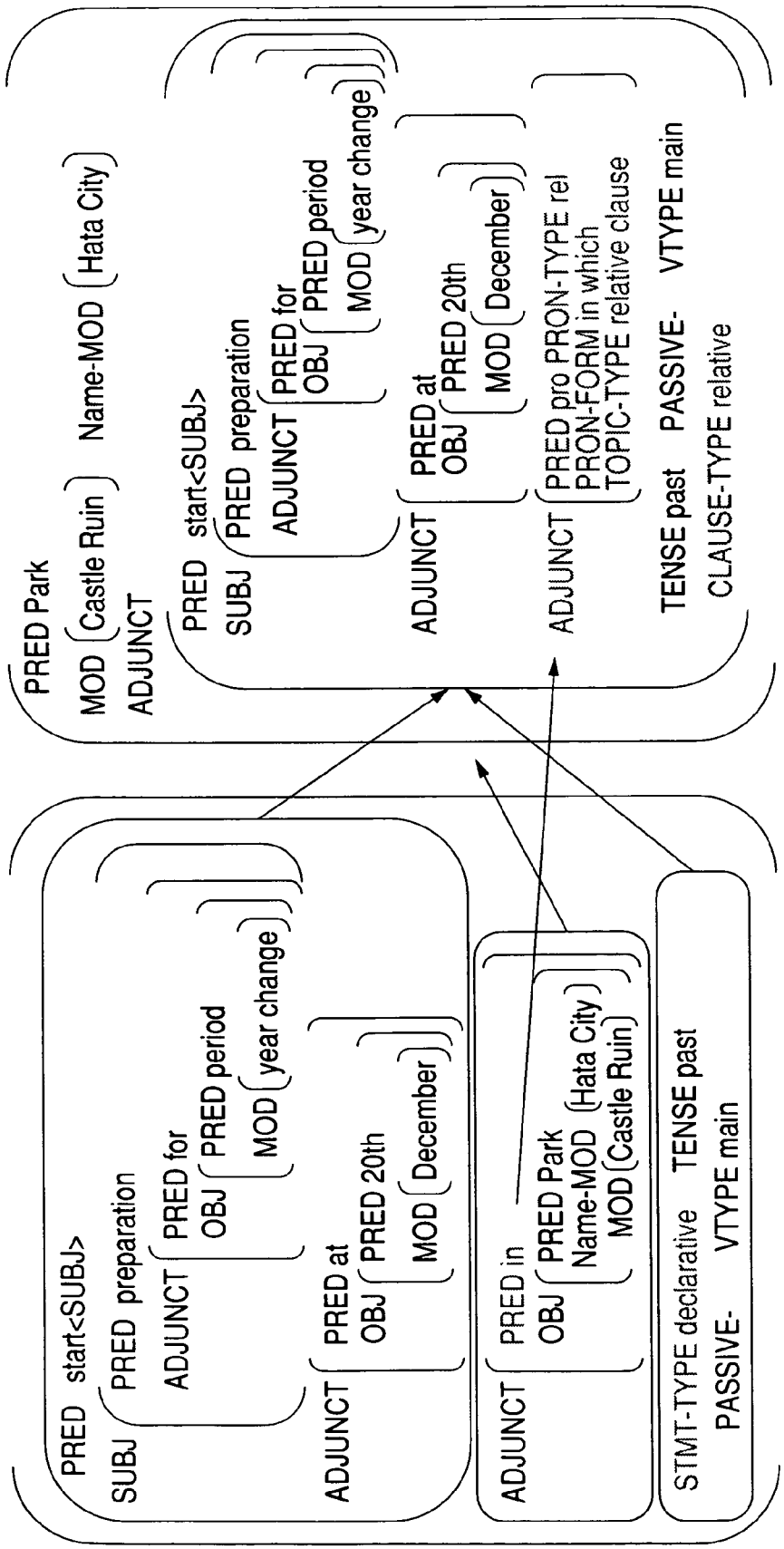

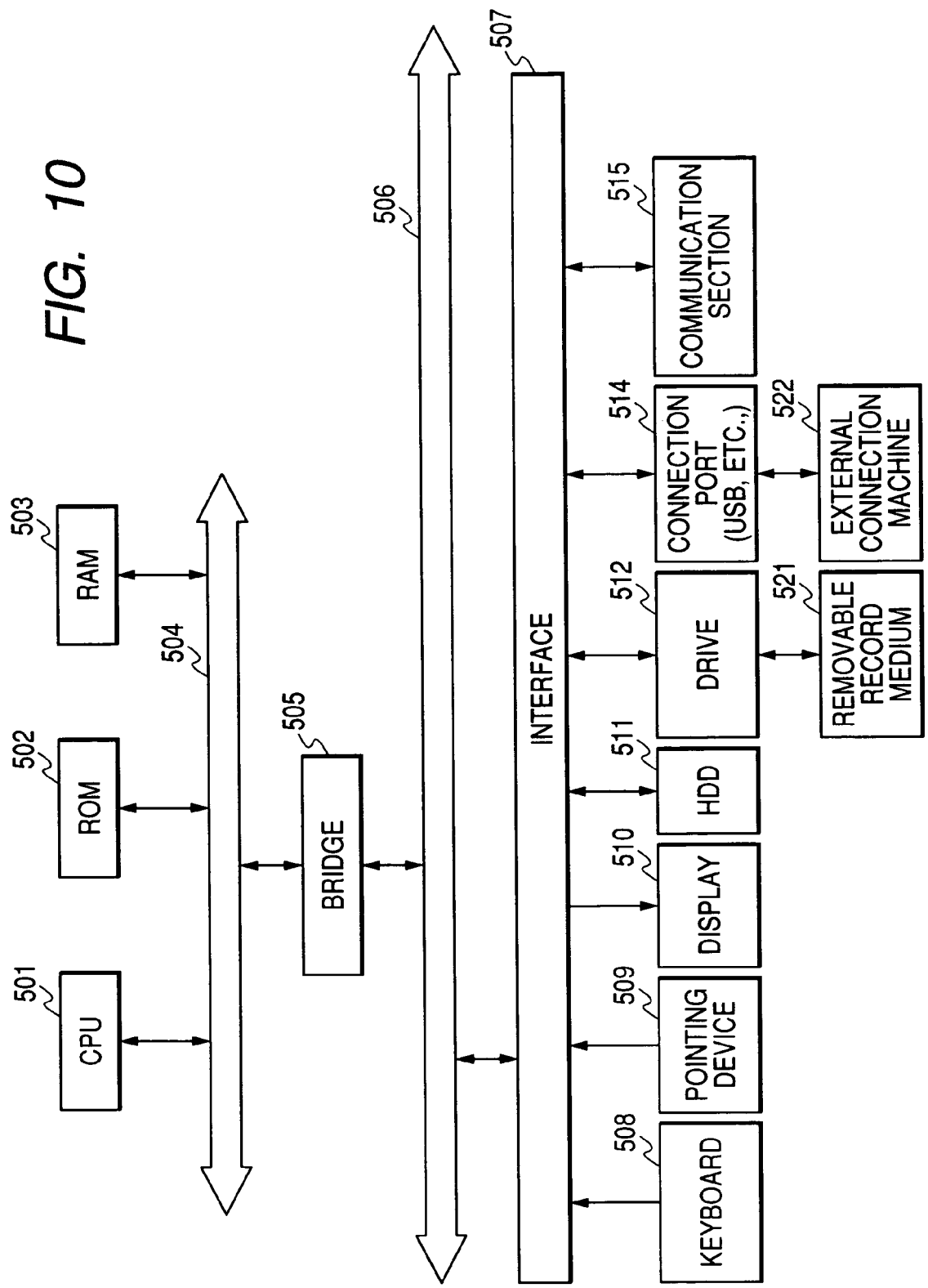

QUESTION ANSWERING SYSTEM, DATA SEARCH METHOD, AND COMPUTER PROGRAM

BACKGROUND OF THE INVENTION

1. Field of the Invention

This invention relates to a question answering system, a data search method, and a computer program, and more particularly to a question answering system, a data search method, and a computer program, which can provide a more precise answer to a question in a system wherein the user enters a question sentence and an answer to the question is provided.

2. Description of the Related Art

Recently, network communications through the Internet, etc., have grown in use and various services have been conducted through the network. One of the services through the network is search service. In the search service, for example, a search server receives a search request from a user terminal such as a personal computer or a mobile terminal connected to the network and executes a process responsive to the search request and transmits the processing result to the user terminal.

For example, to execute search process through the Internet, the user accesses a Web site providing search service and enters search conditions of a keyword, category, etc., in accordance with a menu presented by the Web site and transmits the search conditions to a server. The server executes a process in accordance with the search conditions and displays the processing result on the user terminal.

Data search process involves various modes. For example, a keyword-based search system wherein the user enters a keyword and list information of the documents containing the entered keyword is presented to the user, a question answering system wherein the user enters a question sentence and an answer to the question is provided, and the like are available. The question answering system is a system wherein the user need not select a keyword and can receive only the answer to the question; it is widely used.

For example, JP 2002-132811 A discloses a typical question answering system. JP 2002-132811 A discloses a question answering system including a question analysis section. The question analysis section determines a search word (keyword), which is applied in searching, and the question type from a question sentence presented by the user. The question answering system executes procedures of making a search based on the search word (keyword), applying an answer extraction rule to a search result, which is a sentence containing the search word (keyword) to extract answer candidates, ranking the obtained answer candidates to output them.

The search result based on the search word (keyword) is an article of a document, for example, and generally is made up of a plurality of sentences. How the accuracy of processing of selecting appropriate words as answer candidates to the question from the search result is enhanced is one problem.

For example, "NTT's Question Answering System for NTCIR QAC2," (Isozaki. H, Working Notes of NTCIR-4 Workshop, pp. 326-332 (2004); hereinafter referred to as non-patent document 1) discloses a configuration for setting one unit (passage) of text contained in a search result as a variable-length morpheme string (window), searching a range of the window containing a given search word as a search target passage, applying a preset answer extraction rule to a search target passage portion, and efficiently extracting answer candidates. Thus, searching of the portion containing a possible answer candidate in most of existing question answering systems is designed based on the philosophy of acquiring a close portion from the keyword contained in the question sentence. "Importance of Pronominal Anaphora Resolution in Question Answering System" (Jose Luis Vicedo and Antonio Ferrandez, ACL 2000; hereinafter referred to as non-patent document 2) points out the importance of anaphoric analysis in a question answering system, namely, the importance of determining as to whether representations of noun phrases and pronouns contained in the text as the search result are identical with each other, and describes that it is effective to extract answer candidates with applying anaphoric analysis.

As described above, several propositions have been made for how answer candidates to a question are extracted efficiently and with high accuracy from the text as the search result based on the search word (keyword) in the question answering system for providing an answer corresponding to a user's question. However, the technique of the non-patent document 1 attempts to extract an answer candidate with assuming that a portion containing the answer candidate is in the vicinity of a keyword of a sentence containing a search keyword. In this technique, the context of the search document is not considered and therefore if an appropriate answer candidate does not exist before or after the text portion that the keyword most matches, the system cannot provide a right answer; this is a problem.

The non-patent document 2 recommends applying the anaphoric analysis processing. However, in the case of applying the anaphoric analysis processing to a document, which is a search result, if the context of the document obtained as the search result is complicated, a right answer cannot be obtained in some cases; this is a problem. A specific example will be discussed below.

By way of example, it is assumed that an input question from a client (questioner user) is the following sentence:

Question Sentence
"Where is a Christmas tree of a pine tree popular among enthusiasts?"

Assume that this question is input to a question answering system. Since the question contains "Where is . . . ?" the question answering system determines that the question is a question about "place." The question type determination processing is executed in most existing techniques.

Further, the question answering system extracts a search word (keyword) applied to searching from the question sentence. Here, it is assumed that the keywords of "Christmas tree, pine tree, popular, enthusiasts" are extracted and that documents are searched using the keywords and one article made up of the following sentences is found:

Sentence 1:
Preparations for the year change period started at the 20th of December in Hata City Castle Ruin Park.
Sentence 2:
In the park, a pine tree was decorated and became a Christmas tree.
Sentence 3:
Generally, a fir tree is used as a Christmas tree.
Sentence 4:
A giant Christmas tree of Rockefeller Center in New York is world-famous.
Sentence 5:
However, this tree of the pine tree also has a wonderful appeal and is popular among enthusiasts.

This article is made up of sentences 1 to 5 and extracted as a result of searching databases and Web pages, which are search targets (knowledge sources), by using the keyword search of "Christmas tree, pine tree, popular, enthusiasts."

In the article as the search result, a topic of a Christmas tree in Hata City Castle Ruin Park is mentioned in sentence 2 and then, a topic of general Christmas trees is mentioned in sentences 3 and 4 and again the topic of the Christmas tree in Hata City Castle Ruin Park is mentioned in sentence 5.

The match degree between each of sentences 1 to 5 and the keywords is analyzed. Sentence 2 contains two keywords and sentence 5 contains three keywords, and thus, it is determined that sentences 2 and 5 have high match degree with the keywords. In the existing answer candidate extraction method, "New York" contained in sentence 5 or "Rockefeller Center" contained in sentence 4, which is "place" in the vicinity of the sentence most matching the keywords, is selected preferentially as an answer candidate to the question.

The true answer "Hata City Castle Ruin Park" is contained in sentence 1, but sentence 1 does not contain any keywords applied to the searching. Therefore, it is determined that sentence 1 is low in the match degree with the keywords. Answer candidate extraction from sentence 1 is executed after answer candidate extraction processing in the vicinity of a sentence having high match degree with the keywords. If a potent answer candidate is extracted in the sentence having high match degree with the keywords or in the vicinity of such a sentence, answer candidate extraction processing from sentence 1 may be unexecuted and consequently, the true answer "Hata City Castle Ruin Park" may not be presented to the user, because the noun phrase existing in the vicinity of the sentence having high match degree with the keywords is selected preferentially as an answer candidate in the existing answer candidate extraction method.

However, the right answer is "Hata City Castle Ruin Park" in sentence 1. Considering the structure of the article extracted as the search result, sentences 3 and 4 of general topics are inserted in midpoint of the context and the description relevant to the Christmas tree of the pine tree in Hata City Castle Ruin Park is distributed. Thus, it is made difficult to select "Hata City Castle Ruin Park" in sentence 1 as an answer to the question sentence.

Here, the case where anaphoric analysis recommended in the non-patent document 2, namely, it is determined as to whether representations of noun phrases, pronouns, and zero pronouns in the text as the search result are identical with each other is executed will be discussed. The case where anaphoric analysis is applied on the article obtained as the search result using an existing anaphoric analysis technique based on the non-patent document 2 and processing of grasping the anaphoric relation in sentences 1, 2, and 5 is performed will be discussed with reference to FIG. 1.

In the anaphoric analysis, identity determination between words in different representations is made. For example, in the anaphoric analysis, it is seen in FIG. 1 that (a-1) "Hata City Castle Ruin Park" in sentence 1 and (a2) "park" in sentence 2 are identical and indicate the same entity in different representations.

(b1) "Christmas tree" in sentence 2 and (b2) "this tree" in sentence 5 match. Also, in language such as Japanese language in which zero pronouns often appear, (b2) "this tree" is recognized as a zero pronoun with respect to "popular", and this zero pronoun is a target of the anaphoric analysis. Furthermore, (c1) "pine tree" in sentence 2, (c2) (pine tree), zero pronoun of the subjective case of "became" in sentence 2, and (c3) "the pine tree" in sentence 5 match.

Thus, in the anaphoric analysis, identity determination between representations of noun phrases, pronouns, and zero pronouns in the text is made. However, in the anaphoric analysis of the related art, the identity determination between representations is only made and processing of moving "Hata City Castle Ruin Park" in sentence 1 to sentence 5, for example, is not performed. Sentence 5 only tells popularity of "the Christmas tree of the pine tree" and such information containing "Hata City Castle Ruin Park" in sentence 5 does not exist. Thus, if only the existing anaphoric analysis processing is executed, it is difficult to arrange the search target of the complicated text or to execute extraction processing of the right answer candidate; this is a problem.

SUMMARY OF THE INVENTION

The invention provides a question answering system, a data search method, and a computer program, which can efficiently extract an appropriate search result for a question answer even from a document of a complicated context structure.

According to one embodiment of the invention, a question answering system includes a question input unit, a search unit, an anaphoric analysis unit, an information extraction unit and an answer candidate extraction unit. The question input unit is input to a question. The search unit executes search processing on a basis of the input question. The anaphoric analysis unit executes anaphoric analysis processing on a search result of the search unit. The information extraction unit extracts sentences, which include expressions having a reference relation therebetween, as reference relation sentences, the reference relation determined by finding relation in an expressions of at least one of a noun phrase, a pronoun, and a zero pronoun between sentences in the search result on a basis of a result of the anaphoric analysis executed by the anaphoric analysis unit. The information extraction unit selects a first candidate sentence from a passage obtained as the search result and selects a second candidate sentence, which is the reference relation sentence of the first candidate sentence. The answer candidate extraction unit extracts an answer candidate from the first and second candidate sentences selected by the information extraction unit.

According to one embodiment of the invention, a data search method includes inputting a question; executing search processing on a basis of the input question; executing anaphoric analysis processing on a search result of the search unit; arranging expressions including one of a noun phrase, a pronoun, and a zero pronoun at least contained in the search result on a basis of a result of the anaphoric analysis; extracting sentences, which include expressions having a reference relation therebetween, as reference relation sentences; selecting a first candidate sentence from a passage obtained as the search result; selecting a second candidate sentence, which is the reference relation sentence of the first candidate sentence; and extracting an answer candidate from the first and second candidate sentences selected.

According to one embodiment of the invention, a computer program is stored in a storage medium. The computer program causes a computer to execute data search processing. The data search processing includes inputting a question; executing search processing on a basis of the input question; executing anaphoric analysis processing on a search result of the search unit; extracting sentences, which include expressions having a reference relation therebetween, as reference relation sentences, the reference relation determined by finding relation in an expressions of at least one of a noun phrase, a pronoun, and a zero pronoun between sentences in the search result on a basis of a result of the anaphoric analysis; selecting a first candidate sentence from a passage obtained as the search result; selecting a second candidate sentence, which is the reference relation sentence of the first candidate sentence; and extracting an answer candidate from the first and second candidate sentences selected.

The computer program as set forth above may be a computer program that can be provided by a record medium or a communication medium for providing the computer program for a computer system that can execute various program codes in a computer-readable format, for example, a record medium such as a CD, an FD, or an MO or a communication medium such as a network. Such a program is provided in the computer-readable format, whereby processing responsive to the program is realized in a computer system.

In addition to extracting the reference relation of the representations of any of a noun phrase, a pronoun and a zero pronoun, a combination of the noun representations or all reference relations may be extracted. The sentence-level anaphoric relation may be obtained to thereby extract the reference relation with regard to an embed sentence or the whole sentence. (With regard to an example of the anaphoric analysis containing the whole sentence as a target, see "An Estimate of Referent of Nouns in Japanese Sentences with Referential Property of Nouns" (MURATA Masaki and NAGAO Makoto, Natural Language Processing, Vol. 3. No. 1, (1996))

The above and other objects, features and advantages of the invention will be apparent from the following detailed description of the preferred embodiment of the invention in conjunction with the accompanying drawings. The system in the specification is a logical set made up of a plurality of units (apparatus) and is not limited to a set of units (apparatus) housed in a single cabinet.

According to the configuration set forth above, if a sentence is selected based on match degree with a search keyword in the processing of selecting a candidate sentence, it is made possible to reliably acquire a potent answer candidate at a position distant from a keyword as an answer candidate without missing the answer candidate and present the answer candidate to the client.

BRIEF DESCRIPTION OF THE DRAWINGS

In the accompanying drawings:

FIG. 1 is a drawing to describe an example of conducting anaphoric analysis on an article obtained as the search result using an existing anaphoric analysis technique;

FIG. 3 is a block diagram to describe the configuration of the question answering system according to one embodiment of the invention;

FIG. 4 is a drawing to describe an example of anaphoric analysis processing executed by the question answering system according to the embodiment of the invention;

FIG. 5 is a drawing to describe score calculation processing in the question answering system according to the embodiment of the invention;

FIG. 6 is a flowchart to describe the processing sequence executed by the question answering system according to the embodiment of the invention;

FIG. 10 is a block diagram to describe a hardware configuration example of the question answering system according to the embodiment of the invention.

DETAILED DESCRIPTION OF EMBODIMENTS OF THE INVENTION

A question answering system, a data search method, and a computer program according to an embodiment of the invention will be discussed in detail with reference to the accompanying drawings.

FIRST EXAMPLE

Figure 2:
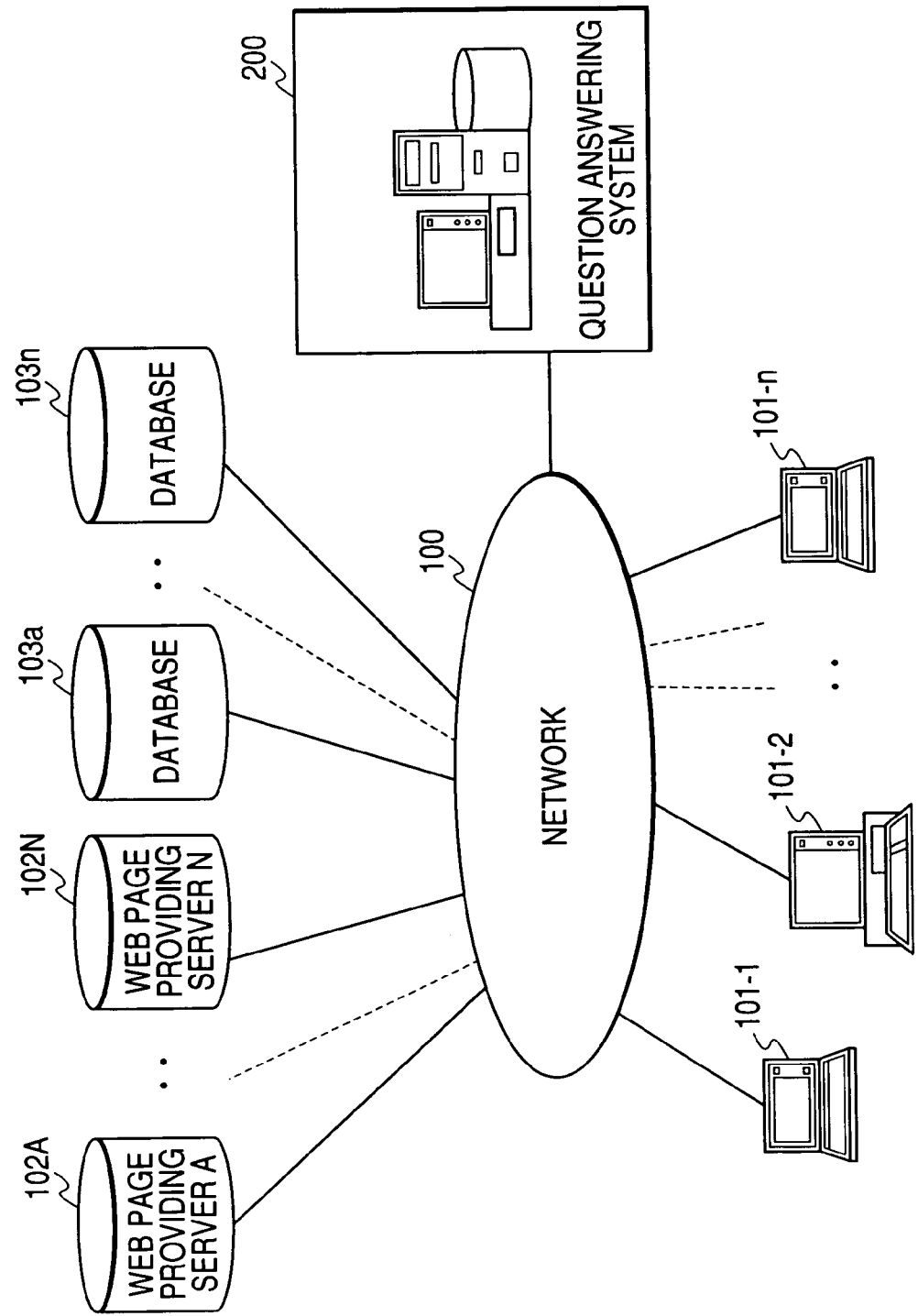
FIG. 2 is a drawing of the network configuration to show an application example of a question answering system of the invention.

To begin with, an example of the question answering system of the invention will be discussed with reference to FIG. 2. FIG. 2 is a drawing to show the network configuration wherein a question answering system 200 according to this example of the invention is connected to a network. A network 100 shown in FIG. 2 is the Internet, an intranet, etc. Connected to the network 100 are clients 101-1 to 101-$n$ as user terminals for transmitting a question to the question answering system 200 and various Web page providing servers 102A to 102N for providing Web pages as materials to acquire answers to the clients 101-1 to 101-$n$ and databases 103$a$ to 103$n$.

The question answering system 200 inputs various question sentences generated by the users from the clients 101-1 to 101-$n$ and provides the answers to the input questions for the clients 101-1 to 101-$n$. The answers to the questions are acquired from the Web pages provided by the Web page providing servers 102A to 102N, document data stored in the databases 103$a$ to 103$n$, and the like. The Web pages provided by the Web page providing servers 102A to 102N and the data stored in the databases 103$a$ to 103$n$ are the data to be searched and are called a corpus or information sources, knowledge sources, etc.

The Web page providing servers 102A to 102N provide Web pages as pages opened to the public by a WWW (World Wide Web) system. The Web page is a data set displayed on a Web browser and includes text data, HTML layout information, an image, audio, a moving image, etc., embedded in a document. A set of Web pages is a Web site, which includes a top page (home page) and other Web pages linked from the top page.

The configuration and processing of the question answering system 200 will be discussed with reference to FIG. 3. The question answering system 200 is connected to the network 100 and executes processing of receiving an answer from a client connected to the network 100, searching the Web pages provided by the Web page providing servers and other databases connected to the network 100 as the information sources for an answer, generating a list of answer candidates, for example, and providing the list for the client.

The question answering system 200 according to this example of the invention executes anaphoric analysis processing on a search document, which is a search result obtained by making a search in response to a question from a client to consider the context thereof. The processing is similar processing to that described in the non-patent document 2; this processing differs from the processing described in the non-patent document 2 in that it expands a search range for the answer candidate later on the basis of the anaphoric analysis processing.

The question answering system according to this example of the invention arranges a search area for the answer candidate in the search document so as to easily search based on the result of the anaphoric analysis processing on the search document. The configuration and processing of the question answering system according to this example of the invention will be discussed in detail with reference to FIG. 3.

To begin with, the configuration of the question answering system 200 according to this example of the invention will be discussed with reference to FIG. 3. As shown in FIG. 3, the question answering system 200 has a question input unit 201, a question analysis unit 202, an information search unit 203, an anaphoric analysis unit 204, an information extraction unit 205, an answer candidate extraction unit 206, an answer candidate selection unit 207, and an answer output unit 208. The processing executed by each unit of the question answering system 200 will be discussed below.

[Question Input Unit]

The question input unit 201 is input to a question sentence (input question) from a client through the network 100. In the description to follow, as a specific question example, it is assumed that the input question from a client (questioner user) is the following sentence:

(Input Sentence)
"Where is a Christmas tree of a pine tree popular among enthusiasts?"

It is assumed that this question is input to the question answering system 200.

[Question Analysis Unit]

The question analysis unit 202 executes analysis processing of the input sentence. For example, a question type as to whether an answer required by the question is a person or a place is determined and a feature word used as a search word (search keyword) is detected from a sentence of the question.

(Input Sentence)
"Where is a Christmas tree of a pine tree popular among enthusiasts?"

Since the question contains "Where is . . . ?", it is determined that the question is a question about "place." The question type determination processing is similar to processing executed in most existing techniques.

Further, the question analysis unit 202 extracts a search word (keyword) applied to searching, from the question sentence. Here, it is assumed that keywords of "Christmas tree, pine tree, popular, enthusiasts" are extracted.

The information search unit 203 executes a search based on the search word (search keyword) extracted by analysis of the question analysis unit 202. That is, for example, the information search unit 203 executes search processing using the Web pages provided by the Web page providing servers 102A to 102N connected to the network 100 and the databases 103a to 103n connected to the network 100 as documents to be searched (knowledge sources) and acquires text determined to contain an answer to the question.

Here, it is assumed that documents are searched using the keywords of "Christmas tree, pine tree, popular, enthusiasts" described above and one article made up of the following sentences is found:

Sentence 1:
Preparations for the year change period started at the 20th of December in Hata City Castle Ruin Park.
Sentence 2:
In the park, a pine tree was decorated and became a Christmas tree.
Sentence 3:
Generally, a fir tree is used as a Christmas tree.
Sentence 4:
A giant Christmas tree of Rockefeller Center in New York is world-famous.
Sentence 5:
However, this tree of the pine tree also has a wonderful appeal and is popular among enthusiasts.

The search result is made up of sentences 1 to 5 and is extracted as a result of searching databases, Web pages, etc., which are the search targets (knowledge sources), by executing keyword search of "Christmas tree, pine tree, popular, enthusiasts."

[Anaphoric Analysis Unit]

The anaphoric analysis unit 204 executes anaphoric analysis processing on a search document obtained as the search result of the information search unit 203. The anaphoric analysis processing is executed as processing of analyzing a text obtained as the search result to make an identity determination of representation of any of a noun phrase, a pronoun, and a zero pronoun in the text. The anaphoric analysis technique is described in detail, for example, in "Analyze omission using automatically developed case dictionary and position preference order of antecedent" (KAWAHARA daisuke and KUROHASHI sadao, Natural Language Processing, Vol. 11, No. 3 (2004)), "One technique of anaphoric analysis of Japanese-language noun phrase by machine learning" (IIDA Ryuu, INUI Kentarou, MATSUMOTO Hiroharu and SEKINE sou, Language Processing Society 10th annual conference (2004)) and "A Machine Learning Approach to Coreference Resolution of Noun Phrases" (W. M. Soon, H. T. Ng, and D. C. Y. Lim, Computational Linguistics, Vol. 27, No. 4, pp. 521-544, (2001).

In the example, it is assumed that the search result made up of the following sentences 1 to 5 are already obtained:

Sentence 1:
Preparations for the year change period started at the 20th of December in Hata City Castle Ruin Park.
Sentence 2:
In the park, a pine tree was decorated and became a Christmas tree.
Sentence 3:
Generally, a fir tree is used as a Christmas tree.
Sentence 4:
A giant Christmas tree of Rockefeller Center in New York is world-famous.
Sentence 5:
However, this tree of the pine tree also has a wonderful appeal and is popular among enthusiasts.

It is assumed that anaphoric analysis is conducted on the search result and the following anaphoric analysis result is obtained:

(a-1) "Hata City Castle Ruin Park" in sentence 1 and (a2) "park" in sentence 2 are identical and indicate the same entity in different representations.

(b1) "Christmas tree" in sentence 2, (b2) "This tree" in sentence 5 match.

and further (c1) "pine tree" in sentence 2 and (c3) "the pine tree" in sentence 5 match.

In the case of the anaphoric analysis in Japanese language, (b3) (Christmas tree of the pine tree) in sentence 5 is recognized as a zero pronoun of the subjective case of "popular" in sentence 5, and (c2) (pine tree) in sentence 2 is recognized as a zero pronoun of the subjective case of "became" in sentence 2. Results of the anaphoric analysis in Japanese language show that the zero pronoun in sentence 5 matches (b1) "Christmas tree" in sentence 2 and (b2) "This tree" in sentence 5, and also the zero pronoun in sentence 2 matches (c1) "pine tree" in sentence 2 and (c3) "the pine tree" in sentence 5.

The analysis result is similar to the result previously described with reference to FIG. 1.

[Information Extraction Unit]

As described above, in the existing technique, in a case of selecting a plurality of sentences (a passage) from which each answer candidate is extracted, processing of preferentially selecting a sentence (passage) having high match degree with the keyword is performed.

In sentences 1 to 5, sentence 2 contains two keywords and sentence 5 contains three keywords and it is determined that sentences 2 and 5 have high match degree with the keywords. In the existing method, sentence 5 is the most effective sentence in answer candidate selection and sentence 2 is the second most effective sentence, and a noun phrase in the vicinity of sentence 5 is selected preferentially as an answer candidate.

In the actual processing of selecting an answer candidate, for example, the following processing is executed. First, an answer candidate is extracted from sentences (candidate sentences) including the sentence 5 and sentences preceding and following the sentence 5. Then, an answer candidate is extracted from sentences (candidate sentences) including the sentence 2 and sentences preceding and following the sentence 2. In the processing, the sentences preceding and following the sentences 2 and 5 are handled as sentences in the vicinity of the sentences 2 and 5, respectively.

In the question answering system according to this example of the invention, the information extraction unit 205 executes selection processing of each passage, that is, selects a candidate sentence, from which an answer candidate will be extracted, from a passage contained in the search result (in this example, the five sentences from sentence 1 to sentence 5). The information extraction unit 205 executes answer extraction processing from the candidate sentence. The selection processing and the answer extraction processing executed by the answer extraction unit 205 are different from conventional processing to which the anaphoric analysis processing is applied. Specifically, the information extraction unit 205 expands candidate sentences from which answer candidate will be extracted, on a basis of the result of the anaphoric analysis and extracts the answer candidates from the expanded candidate sentence.

Specific processing will be discussed.

The information extraction unit 205 arranges the representations of any of a noun phrase, a pronoun, and a zero pronoun based on the result of the anaphoric analysis for each sentence obtained as the search result (in this example, sentences 1 to 5), and extracts sentences sharing representations having reference relation therebetween. This processing will be discussed with reference to FIG. 4.

The following anaphoric analysis results (1) to (3) are obtained:

(1) (a-1) "Hata City Castle Ruin Park" in sentence 1 and (a2) "park" in sentence 2 match;

(2) (b1) "Christmas tree" in sentence 2 and (b2) "This tree" in sentence 5 match and (3) (c1) "pine tree" in sentence 2 and (c3) "the pine tree" in sentence 5 match, as shown in FIG. 4.

In the case of the anaphoric analysis in Japanese language, (b3) (Christmas tree of the pine tree) in sentence 5 is recognized as a zero pronoun of the subjective case of "popular" in sentence 5, and (c2) (pine tree) in sentence 2 is recognized as a zero pronoun of the subjective case of "became" in sentence 2. Results of the anaphoric analysis in Japanese language show that the zero pronoun in sentence 5 matches (b1) "Christmas tree" in sentence 2 and (b2) "This tree" in sentence 5, and also the zero pronoun in sentence 2 matches (c1) "pine tree" in sentence 2 and (c3) "the pine tree" in sentence 5.

The information extraction unit 205 arranges the representation of any of a noun phrase, a pronoun, and a zero pronoun based on the result of the anaphoric analysis and extracts sentences sharing the representation having the reference relation therebetween (reference relation sentences). The reference relation sentences sharing the representation having reference relation therebetween are sentences having the representation referencing the same entity in the anaphoric analysis results (1) to (3) described above. It is determined:

that sentences 1 and 2 share the representation having reference relation therebetween from the anaphoric analysis result (1);

that sentences 2 and 5 share the representation having reference relation therebetween from the anaphoric analysis result (2); and that sentences 2 and 5 share the representation having reference relation therebetween from the anaphoric analysis result (3).

The information extraction unit 205 thus arranges the representations in the text based on the results of the anaphoric analysis and selects reference relation sentences.

In the example, the reference relation sentences are [sentences 1 and 2] and [sentences 2 and 5].

As described above, in the processing of selecting a candidate sentence from which an answer candidate will be extracted, for example, match degree of each sentence (passage) with the keywords is calculated. In sentences 1 to 5, sentence 2 contains two keywords and sentence 5 contains three keywords. Therefore, it is determined that sentences 2 and 5 have high match degree with the keywords. In the existing method, sentence 5 is regarded as the most effective sentence in selecting answer candidate and sentence 2 is regarded as the second most effective sentence, and a noun phrase in the vicinity of sentence 5 is selected preferentially as an answer candidate. Then, the existing method selects preferentially a noun phrase in the vicinity of sentence 2 as an answer candidate.

In the question answering system 200 according to this example of the invention, when a candidate sentence is selected based on match degree with the keywords, the information extraction unit 205 determines whether or not a reference relation sentence is set for the selected candidate sentence (serving as a first candidate sentence). If yes, the information extraction unit 205 further selects the reference relation sentence as the candidate sentence (serving as a second candidate sentence).

In this example, when selecting a candidate sentence from which an answer candidate will be extracted, based on sentence 5 having the highest match degree with the keywords, the information extraction unit 205 determines as to whether or not a reference relation sentence corresponding to sentence 5 is set. In this example, sentence 2 is set as the reference relation sentence corresponding to sentence 5, as previously described with reference to FIG. 4. Therefore, the information extraction unit 205 selects sentence 5+sentence 2 and a sentence area including the vicinity of sentences 5 and 2 as a primary preference sentence area for answer candidate extraction.

Next, when selecting a candidate sentence from which an answer candidate will be extracted, based on sentence 2 having the second highest match degree with the keywords only to sentence 5, the information extraction unit 205 determines as to whether or not a reference relation sentence corresponding to sentence 2 is set. In this example, sentence 1 is set as the reference relation sentence corresponding to sentence 2, as previously described with reference to FIG. 4. Therefore, the information extraction unit 205 selects sentence 2+sentence 1 and a sentence area including the vicinity of sentences 2 and 1 as a secondary preference sentence area for answer candidate extraction.

For example, in the case where the information extraction unit 205 selects as the sentence area for answer candidate extraction, a sentence area including sentences preceding and following a sentence (first candidate sentence), which is selected on the basis of match degree with the keywords, firstly the following sentences are selected as the candidate sentence on the basis of sentence 5 having the highest match degree with the keywords.

(a) sentence 5 and sentence 4 preceding sentence 5; and
(b) sentence 2, which is the reference relation sentence corresponding to sentence 5, and sentences 1 and 3 preceding and following sentence 2.

Secondly, the following sentences are selected as the candidate sentences on the basis of sentence 2 having the second highest match degree with the keywords only to sentence 5.

(c) sentence 2 and sentences 1 and 3 preceding and following sentence 2; and
(d) sentence 1, which is the reference relation sentence corresponding to sentence 2, and sentence 2 following sentence 1

In fact, the sentences selected in (c) and (d) are already selected in (a) and (b) and therefore may be omitted. In the example, duplicate selected sentences occur because the passage is made of small number of sentences (i.e., sentences 1 to 5); however, if a long article is obtained as the search result, candidate sentences may be selected in order without selecting sentences redundantly.

[Answer Candidate Extraction Unit]

The answer candidate extraction unit 206 executes answer candidate extraction processing using the sentences, which the information extraction unit 205 selects as the candidate sentence by executing the candidate sentence extraction processing while considering the reference relation sentences as described above.

The answer candidate extraction unit 206 selects each noun phrase corresponding to "place", which is of the question type obtained by the question analysis unit 202 described above, out of the candidate sentences selected by the information extraction unit 205. When selecting each noun phrase corresponding to "place," the answer candidate extraction unit 206 may use an existing NE technique so as to acquire each noun to which a "place" tag of an NE (named entity) tag indicating lexis is assigned from the candidate sentences.

In the processing of this example, the information extraction section 205 selects the candidate sentences from which an answer candidate will be extracted, while considering a reference relation sentence as described above. In this example, it is assumed that all of sentences 1 to 5 are selected as the candidate sentence. The following noun phrases are selected as noun phrases corresponding to "place" from sentences 1 to 5:

"Hata City Castle Ruin Park"
"New York"
"Rockefeller Center"

[Answer Selection Unit]

The answer selection unit 207 sets score indicating a suitability degree as an answer, for each answer candidate extracted by the answer candidate extraction unit 206. Then, the answer selection unit 207 ranks the answer candidates, and generates an answer candidate list in which the answer candidates are arranged in the descending order of the score. The answer selection unit 207 sets the scores for the answer candidates in accordance with the following score addition criteria (a) and (b):

(a) Add to each answer candidate, score obtained on the basis of a keyword match degree of a sentence containing each answer candidate.
(b) If the sentence containing each answer candidate has a reference relation sentence, add to each answer candidate, score obtained on the basis of a keyword match degree of the reference relation sentence.

That is, the answer selection unit 207 sets for each answer candidate as a score of each answer candidate, a total sum of the score obtained on the basis of the keyword match degree of a sentence containing each answer candidate and the score obtained on the basis of the keyword match degree of the reference relation sentence corresponding to the sentence containing each answer candidate.

Specific score calculation processing of this example will be described with reference to FIG. 5. FIG. 5A shows keywords, which are applied to searching and extracted by the question analysis unit 202 on the basis of (input sentence)

"Where is a Christmas tree of a pine tree popular among enthusiasts?".

The keywords are "Christmas tree, pine tree, popular, enthusiasts."

FIG. 5B shows the search result, which the information search unit 203 obtains by searching the knowledge source based on the keywords. The search result is made up of the following sentences 1 to 5:

Sentence 1:
Preparations for the year change period started at the 20th of December in Hata City Castle Ruin Park.
Sentence 2:
In the park, a pine tree was decorated and became a Christmas tree.
Sentence 3:
Generally, a fir tree is used as a Christmas tree.
Sentence 4:
A giant Christmas tree of Rockefeller Center in New York is world-famous.
Sentence 5:
However, this tree of the pine tree also has a wonderful appeal and is popular among enthusiasts.

It is assumed that the search result made up of the sentences 1 to 5 has already obtained.

The anaphoric analysis unit 204 executes anaphoric analysis on the search result as previously described with reference to FIG. 4, and determines:

that sentences 1 and 2 are reference relation sentences sharing representations having a reference relation therebetween; and that sentences 2 and 5 are also reference relation sentences sharing representations having a reference relation therebetween.

FIG. 5B shows the keywords contained in sentences 1 to 5 by rectangular regions.

Sentence 2 contains the two keywords [pine tree] and [Christmas tree] and sentence 5 contains three keywords [pine tree], [popular], and [enthusiasts].

As described above, the answer candidate extraction unit 206 selects the following answer candidates:

"Hata City Castle Ruin Park"
"New York"
"Rockefeller Center"

The answer selection unit 207 sets score for each answer candidate. It is confirmed from the result of the anaphoric analysis executed by the anaphoric analysis unit 204 that "Hata City Castle Ruin Park" is a representation indicating the same entity as "park" in sentence 2. Therefore, the answer selection unit 207 calculates scores while considering "park" as a similar answer candidate to "Hata City Castle Ruin Park."

A simple scoring example is shown. Sentence 4 does not contain any keywords in the question sentence "Christmas tree, pine tree, popular, enthusiasts," but sentence 5 following sentence 4 contains the three keywords "pine tree, popular, and enthusiasts". Also, sentence 2 contains the keyword [pine tree] contained in sentence 5 and new keyword "Christmas tree", which is not contained in sentence 5.

Therefore, the scores of the answer candidates "New York" and "Rockefeller Center" contained in sentence 4 are calculated as follows.

A first score value [3] is calculated on the basis of the three keywords "pine tree, popular, and enthusiasts" contained in sentence 5 adjacent to sentence 4.

A second score value [1] is calculated on the basis of the new keyword "Christmas tree" contained in the reference relation sentence of the adjacent sentence 5, namely, in sentence 2.

Then, a final score value [4] is obtained by summing the first score value and the second score value. The answer selection unit 207 gives this final score value [4] to the answer candidates "New York" and "Rockefeller Center" as score of those answer candidates.

The score of the answer candidate "park" ("Hata City Castle Ruin Park") contained in sentence 2 us calculated as follows.

A first score value [2] is calculated on the basis of the two keywords "pine tree and Christmas tree" contained in sentence 2.

A second score value [2] is calculated on the basis of the new keywords "popular and enthusiasts", which are contained in the reference relation sentence of sentence 2, namely, in sentence 5 but is not contained in sentence 2.

Then, the answer selection unit 207 gives a final score value [4] to the answer candidate "park" ("Hata City Castle Ruin Park") as its score.

Accordingly, the answer selection unit 207 sets the scores of the answer candidates as follows:

"park" ("Hata City Castle Ruin Park")=score 4
"New York"=score 4
"Rockefeller Center"=score 4

Consequently, the scores of the answer candidates are set to the same value [4]. In such a case, an answer candidate existing in a location nearest to a keyword has precedence over the other answer candidates. Sentence 2 containing "park" contains a plurality of keywords, and sentence 4 containing "New York" and "Rockefeller Center" does not contain any keyword. Therefore, "park" ("Hata City Castle Ruin Park") is output as the answer candidate closest to the right answer. Since it is seen from the anaphoric analysis result that "park" and "Hata City Castle Ruin Park" refer to the same entity, the question answering system 200 of the example can provide the right answer "Hata City Castle Ruin Park" for the client (questioner user).

The answer selection unit 207 may select a sole answer candidate thus obtained as the answer presented to the client. Alternatively, the answer selection unit 207 may generate and present an answer candidate list as a ranking list based on the score values, for example.

[Answer Output Unit]

The answer output unit 208 outputs the answer candidate finally determined by the answer selection unit 207 to the client.

According to the processing described above, as the answer to the input question (Input Sentence)
"Where is a Christmas tree of a pine tree popular among enthusiasts?"

only
"Hata City Castle Ruin Park"

can be selected or an answer candidate list in which "Hata City Castle Ruin Park" is set in the highest place can be presented to the user.

Next, the processing sequence executed by the question answering system 200 according to this example of the invention will be described with reference to a flowchart of FIG. 6.

At step S101, when a question from a client is input to the question input unit 201, analysis processing of the input question sentence is executed at step S102. The question analysis unit 202 shown in FIG. 3 executes this analysis processing. For example, the keywords "Christmas tree, pine tree, popular, enthusiasts" are extracted from (Input Sentence)
"Where is a Christmas tree of a pine tree popular among enthusiasts?", and the question type is determined as "place" from this input sentence.

Next, at step S103, search processing corresponding to the question is executed on the basis the search keywords. This search processing searches the knowledge sources of Web pages and databases. The information search unit 203 shown in FIG. 3 executes this search processing. The information search unit 203 executes search processing using queries generated on the basis of the keywords selected out of the question sentence.

Specifically, for example, the information search unit 203 searches on the basis of queries including the keywords "Christmas tree, pine tree, popular, enthusiasts" extracted from (Input Sentence)
"Where is a Christmas tree of a pine tree popular among enthusiasts?".

Then, the information search unit 203 obtains the search result made up of the following sentences 1 to 5:

Sentence 1:
Preparations for the year change period started at the 20th of December in Hata City Castle Ruin Park.
Sentence 2:
In the park, a pine tree was decorated and became a Christmas tree.
Sentence 3:
Generally, a fir tree is used as a Christmas tree.
Sentence 4:
A giant Christmas tree of Rockefeller Center in New York is world-famous.
Sentence 5:
However, this tree of the pine tree also has a wonderful appeal and is popular among enthusiasts.

Next, at step S104, anaphoric analysis processing of the search result acquired by executing the search processing is executed the anaphoric analysis unit 204 in FIG. 3 executes this anaphoric analysis processing.

The anaphoric analysis processing analyzes a text obtained as the search result to make an identity determination of representations of any of a noun phrase, a pronoun, and a zero pronoun in the text.

If anaphoric analysis is executed on the search result made up of sentences 1 to 5, the following anaphoric analysis result is obtained:

(a-1) "Hata City Castle Ruin Park" in sentence 1 and (a2) "park" in sentence 5 are identical and indicate the same entity in different representations;

(b1) "Christmas tree" in sentence 2 and (b2) "this tree" in sentence 5 match; and further (c1) "pine tree" in sentence 2 and (c3) "the pine tree" in sentence 5 match.

In the case of the anaphoric analysis in Japanese language, (b3) (Christmas tree of the pine tree) in sentence 5 is recognized as a zero pronoun of the subjective case of "popular" in sentence 5, and (c2) (pine tree) in sentence 2 is recognized as a zero pronoun of the subjective case of "became" in sentence 2. Results of the anaphoric analysis in Japanese language show that the zero pronoun in sentence 5 matches (b1) "Christmas tree" in sentence 2 and (b2) "This tree" in sentence 5, and also the zero pronoun in sentence 2 matches (c1) "pine tree" in sentence 2 and (c3) "the pine tree" in sentence 5.

The analysis result is similar to the result previously described with reference to FIG. 1.

Next, at step S105, a reference relation sentence is extracted from the text obtained as the search result with using the result of the anaphoric analysis and a candidate sentence from which an answer candidate will be extracted is determined. The information extraction unit 205 shown in FIG. 3 executes this processing.

The information extraction unit 205 arranges the representations of any of a noun phrase, a pronoun, and a zero pronoun in the text on the basis of the result of the anaphoric analysis, for each of the sentences obtained as the search result (in the example, sentences 1 to 5). Also, the information extraction unit 205 extracts sentences (reference relation sentences) sharing representations having a reference relation therebetween. This processing is as previously described with reference to FIG. 4.

In the processing example described with reference to FIG. 4, sentences 1 and 2 and sentences 2 and 5 are determined as the reference relation sentences. Further, the information extraction unit 205 calculates the keyword match degree of each sentence, and determines a sentence having the high keyword match degree as a candidate sentence (a first candidate sentence). Also, the information extraction unit 205 checks whether or not a reference relation sentence corresponding to the sentence having the high keyword match degree. If a reference relation sentence exists, the information extraction unit 205 determines that the reference relation sentence as the candidate sentence (a second candidate sentence). Incidentally, the candidate sentence may further include a sentence adjacent to the sentence having the high keyword match degree and/or a sentence adjacent to the reference relation sentence of the sentence having the high keyword match degree.

Next, at step S106, answer candidate extraction processing from the candidate sentences is executed. The answer candidate extraction unit 206 shown in FIG. 3 executes this processing. The answer candidate extraction unit 206 selects respective noun phrase corresponding to "place", which is of the question type obtained by the question analysis unit 202 described above, from the candidate sentences selected by the information extraction unit 205. To select each noun phrase corresponding to "place," an existing NE technique may be used so as to acquire each noun to which a "place" tag of an NE (named entity) tag indicating lexis is assigned from the candidate sentences.

In the processing example described above,
"Hata City Castle Ruin Park"
"New York"
"Rockefeller Center"
are selected as the answer candidates.

Next, at step S107, score calculation processing for each answer candidate is executed with considering the result of the anaphoric analysis and the reference relation sentences. The answer selection unit 207 shown in FIG. 3 executes this processing. The answer selection unit 207 sets score for each answer candidate extracted by the answer candidate extraction unit 206, ranks the answer candidates and generates an answer candidate list in which the answer candidates are arranged in the descending order of the score. The score is set for each answer candidate according to the processing previously described with reference to FIG. 5.

That is, the answer selection unit 207 calculates summation data of score, which is obtained on the basis of keyword match degree of a passage (sentence x) to which an answer candidate belongs and/or its adjacent passage (sentence x±1 or the like), and score, which is obtained on the basis of keyword match degree of a reference relation sentence corresponding to each passage. Then, the answer selection unit 207 outputs the summation data as score for the answer candidate.

Next, at step S108, the answer selection unit 207 selects a sole answer candidate having the highest score as the answer to be presented to the client from among the answer candidates whose scores are calculated or generates an answer candidate list as a ranking list based on the score values.

Next, at step S109, the answer output unit 208 outputs the output answer candidate determined at step S108 or the answer candidate list as the ranking list based on the score values to the client.

According to the processing described above, as the answer to the input question
(Input Sentence)
"Where is a Christmas tree of a pine tree popular among enthusiasts?"
only
"Hata City Castle Ruin Park"
can be selected or an answer candidate list in which "Hata City Castle Ruin Park" is set in the highest place can be presented to the user.

OTHER MODIFIED EXAMPLES

Next, other examples in the question answering system according to the invention will be described.

In the example described above, in the processing of determining candidate sentences, the information extraction unit 205 operates as follows. That is, the information extraction unit 205 calculates keyword match degree of each sentence, determines the sentence having high keyword match degree and/or the sentences adjacent thereto as the candidate sentence (first candidate sentence), and checks whether or not a reference relation sentence corresponding to the sentence having the high keyword match degree exists. If a reference relation sentence exists, the information extraction unit 205 determines the reference relation sentence and/or sentences adjacent to the reference relation sentence as the candidate sentence (second candidate sentence).

In the processing of determining the candidate sentence, the information extraction unit 205 may combines the sentences containing the anaphoric representations on the basis of the result of the anaphoric analysis to generate a single sentence, and set a passage range based on the generated sentence. This processing will be discussed based on the following example sentences:

Sentence 1:
Preparations for the year change period started at the 20th of December in Hata City Castle Ruin Park.
Sentence 2:
In the park, a pine tree was decorated and became a Christmas tree.
Sentence 3:
Generally, a fir tree is used as a Christmas tree.
Sentence 4:
A giant Christmas tree of Rockefeller Center in New York is world-famous.
Sentence 5:
However, this tree of the pine tree also has a wonderful appeal and is popular among enthusiasts.

In this example, an article is made up of sentences 1 to 5 obtained as the search result. In the article, sentences 2 and 5 and sentences 1 and 2 involve the anaphoric relation between the representations contained in those sentences, as described above.

It is assumed that the question answering system has already obtained the analysis result that sentences 2 and 5 contain search keywords and that sentences 2 and 5 have high keyword match degree.

In such a case, processing of combining all of sentences 2 and 5 and sentences 1 and 2 having reference relation therebetween, namely, combines sentences 1, 2, and 5 into a single sentence is executed. A processing described in "Estimate Instruction Target of Noun in Japanese-Language Sentence Using Referentiality of Noun" (MURATA Masaki, KUROHASHI Sadao, NAGAO Makoto, Natural Language Processing, Vol. 3. No. 1, (1996)), which is cited in the description of the processing executed by the anaphoric analysis unit 204, may be used as the integration processing of a plurality of sentences into one sentence.

The sentence obtained by executing the sentence integration processing is adopted as a candidate sentence. The sentence integration processing is executed for sentences, which have the anaphoric relation between representations contained in the sentences and are determined as the reference relation sentences. To combine a plurality of sentences into one sentence, for example, a policy of "creating a relative clause concerning one noun phrase according to a sentence generation technique and combining two sentences into one sentence through the relative clause" is adopted. A procedure example of the sentence integration processing of inputting a plurality of sentences and combining the plurality of sentences into one sentence is shown below.

A target sentence is analyzed using, for example, a syntactic and semantic analysis system described in "Constructing a practical Japanese Parser based on Lexical Functional Grammar" (Masuichi and Ohkuma, natural language processing, Vol. 10. No. 2, pp. 79-109 (2003)), "Japanese Parser on the basis of the Lexical-Functional Grammar Formalism and its Evaluation" (Hiroshi Masuichi, et al., In Proceedings of The 17th Pacific Asia Conference on Language, Information and Computation (PACLIC17), pp. 298-309 (2003)), "The Parallel Grammar Project" (Miriam Butt, Helge Dyvik, Tracy Holloway King, Hiroshi Masuichi, and Christian Rohrer, In Proceedings of COLING-2002 Workshop on Grammar Engineering and Evaluation, pp. 1-7, (2002)), "Lexical-Functional Grammar: A formal system for grammatical representation" (Ronald M. Kaplan and Joan Bresnan, In Joan Bresnan, editor, The Mental Representation of Grammatical Relations, The MIT Press, Cambridge, Mass., pages 173-281, (1982), Reprinted in Dalrymple, Kaplan, Maxwell, and Zaenen, editors, Formal Issues in Lexical-Functional Grammar, 29-130. Stanford: Center for the Study of Language and Information, (1995)), and US 2003/0158723 A, entire contents of which are incorporated herein by reference in its entirety. Information about the syntactic structure of each sentence and the tense of each verb is obtained through this processing.

With regard to generation of sentences 1 and 2, which are integration targets, it is determined according to a generation processing order rule prepared manually in advance that which sentence a relative clause is embedded in the noun phrase of. The verbs of the main clauses of sentences 1 and 2 are both past. In such a case, the preceding sentence is embedded in the following sentence in the sentence appearance order. Such rules describe about the tense of the verb of the main clause, the sentence appearance order and the like. The rule takes precedence in the order of the verb tense and the sentence appearance order.

For example, in sentence generation for the two sentences
"Tarou is fatigued."
"Tarou worked too hard."

the verb of the main clause of the first sentence is present and the verb of the main clause of the second sentence is past. In this case, the rule concerning the tense takes precedence and the second sentence is embedded in the first sentence to form a sentence of "Tarou who worked too hard is fatigued." If the embedding order is opposite like a sentence of "Tarou who is fatigued worked too hard," the original meaning changes.

The above-described example will be discussed. That is, processing of combining sentences 1 and 2 of the following sentences into one sentence is performed Sentence 1:
Preparations for the year change period started at the 20th of December in Hata City Castle Ruin Park.
Sentence 2:
In the park, a pine tree was decorated and became a Christmas tree.
Sentence 3:
Generally, a fir tree is used as a Christmas tree.
Sentence 4:
A giant Christmas tree of Rockefeller Center in New York is world-famous.
Sentence 5:
However, this tree of the pine tree also has a wonderful appeal and is popular among enthusiasts.

Since "Hata City Castle Ruin Park" in sentence 1 and "park" in sentence 2 have the anaphoric relation therebetween, a relative clause sentence concerning "Hata City Castle Ruin Park" in sentence 1 is created. It is seen that the syntactic and semantic structure of sentence 1 has a structure as shown in FIG. 7.

Figure 7:
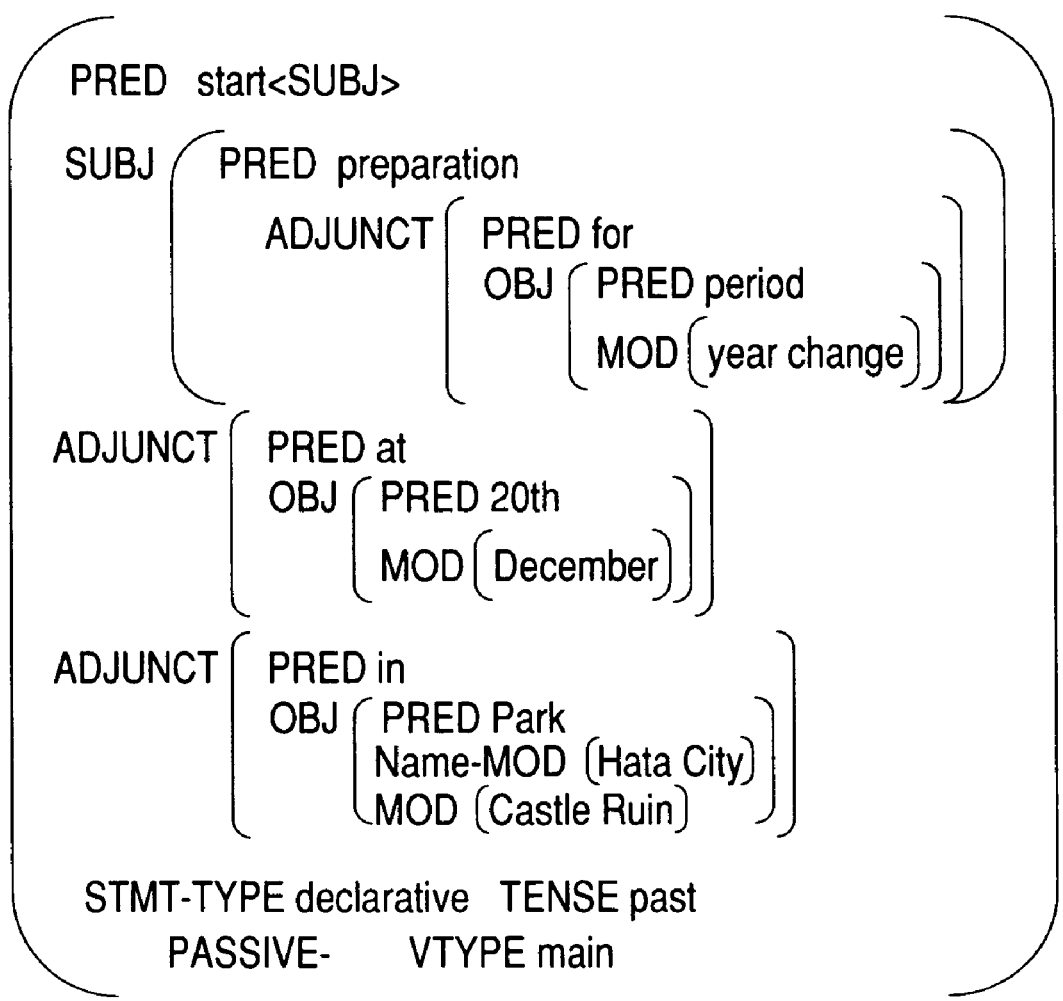
FIG. 7 is a drawing to describe the result data of syntactic and semantic analysis processing on a sentence forming the search result, executed in the question answering system according to the embodiment of the invention.

FIG. 7 shows "f-structure (functional structure)" generated by executing syntactic and semantic analysis processing for Sentence 1:
Preparations for the year change period started at the 20th of December in Hata City Castle Ruin Park.

The syntactic and semantic analysis processing may be performed using the syntactic and semantic analysis system described in "Constructing a practical Japanese Parser based on Lexical Functional Grammar" (Masuichi and Ohkuma, natural language. processing, Vol. 10. No. 2, pp. 79-109 (2003)) or US 2003/0158723 A.

The syntactic and semantic analysis processing applies a grammar rule and a valence dictionary, analyzes the phrase structure based on the grammar rule and the like and analyzes a semantic structure representing a meaning of a sentence based on meaning of words contained in the sentence, semantic relation between the words and the like (the valence dictionary describes the relation with any other component in the sentence such as a verb and a subject, and the semantic relation between a predicate and its dependent word can be extracted). The syntactic and semantic analysis processing outputs "c-structure (constituent structure)" as a result of the syntactic analysis and outputs "f-structure (functional structure)". "c-structure (constituent structure)" representing the phrase structure of the sentence made up of words, morphemes, etc., as a tree structure. "f-structure (functional structure)" is obtained as the result of semantically and functionally analyzing the input sentence as an interrogative sentence, past form, a polite sentence, etc., based on the case structure of a subject, an object, etc.

That is, c-structure represents the structure of a natural language sentence as a tree structure by collecting the morphemes of the sentence into an upper phrase. f-structure represents semantic information of the case structure, sentence tense, aspect, narration, etc., of a sentence as an attribute-attribute value matrix structure based on the notion of the grammar function.

FIG. 7 shows "f-structure (functional structure)" generated by executing syntactic and semantic analysis processing for
Sentence 1:
Preparations for the year change period started at the 20th of December in Hata City Castle Ruin Park.

f-structure represents the grammar function clearly and includes grammar function name, semantic format, and feature symbol. By referring f-structure, semantic understanding of subject, object, complement, adjunct, etc., can be obtained. f-structure is a set of features attached to respective nodes of c-structure shown as a tree structure, and is represented in the form of a matrix of attribute-value as shown in FIG. 7. That is, the left of the entries enclosed in [ ] is the names of the features (attributes) and the right is the values of the features (attribute values).

The syntactic and semantic structure is used to execute the sentence integration processing. For example, the sentence integration processing based on the result of the syntactic and semantic analysis may use processing described in detail in "Chart Generation" (Kay, In Proceedings o the 34th Annual Meeting of the ACL).

As the processing result, the syntactic and semantic structure corresponding to
"Hata City Castle Ruin Park in which preparations for the year change period started at the 20th of December"
is obtained based on
Sentence 1:
Preparations for the year change period started at the 20th of December in Hata City Castle Ruin Park.

FIG. 8 shows the conversion processing of the syntactic and semantic structure.

FIG. 8 shows f-structure (FIG. 8A) obtained as the result of the syntactic and semantic analysis based on
Sentence 1:
Preparations for the year change period started at the 20th of December in Hata City Castle Ruin Park.

Figure 8B:
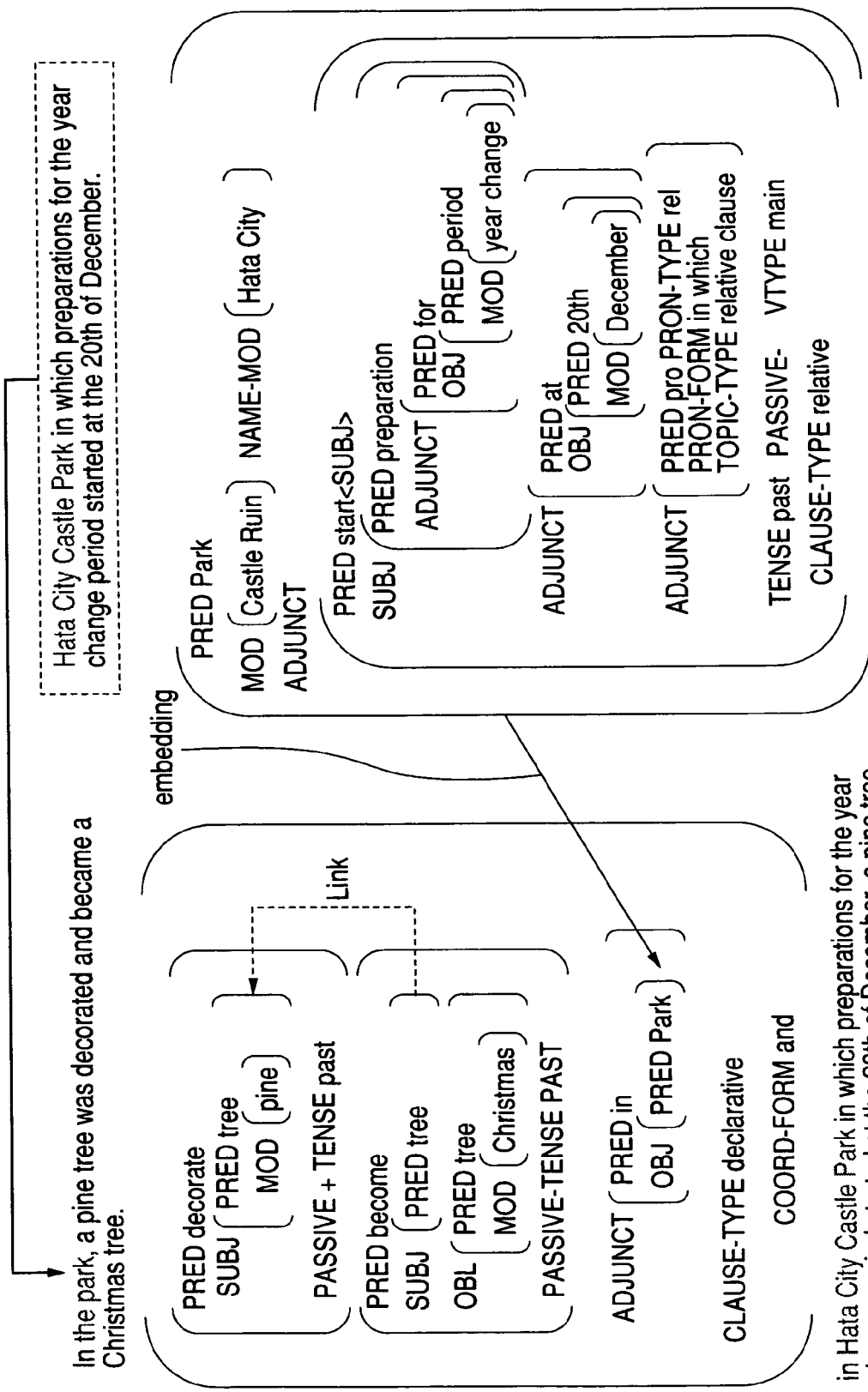
FIG. 8 is a drawing to describe syntactic and semantic structure conversion processing of sentences forming the search result, executed in the question answering system according to the embodiment of the invention.

Also, FIG. 8 shows f-structure (FIG. 8B) obtained as the result of the syntactic and semantic analysis based on
generated sentence (A)
"Hata City Castle Ruin Park in which preparations for the year change period started at the 20th of December"
Next, the relative clause sentence based on sentence 1 having the result of the syntactic and semantic analysis shown in FIG. 8B is embedded in
Sentence 2:
In the park, a pine tree was decorated and became a Christmas tree.

When the embedding processing is performed, sentence 2 is changed to
"In Hata City Castle Ruin Park in which preparations for the year change period started at the 20th of December, a pine tree was decorated and became a Christmas tree."

and the changed sentence 2 is set as an integration sentence into which sentences 1 and 2 are combined.

Subsequently, integrating processing of sentences 2 and 5 generated by executing the above-described processing is executed like the above-described processing. The generation order rule is also applied to sentences 2 and 5 and the embedding order of sentence 2 in sentence 5 is obtained. The sentence embedding processing can also be executed on the syntactic and semantic structure.

If a plurality of entities having an anaphoric relation therebetween exist, the syntactic and semantic structure for each representation referencing the entity must be grasped and an appropriate relative clause sentence must be cut out. In the following sentences 2 and 5:
Sentence 2:
In Hata City Castle Ruin Park in which preparations for the year change period started at the 20th of December, a pine tree was decorated and became a Christmas tree.
Sentence 5:
However, this tree of the pine tree also has a wonderful appeal and is popular among enthusiasts.

the anaphoric relations concerning the two representations of "pine tree" and "Christmas tree" appear. At this time, the verb to which "pine tree" relates is "decorated" and the verb to which "Christmas tree" relates is "became." The sentences are changed so that a verb modifies the expressions between which the anaphoric relation appears.

Figure 9A:
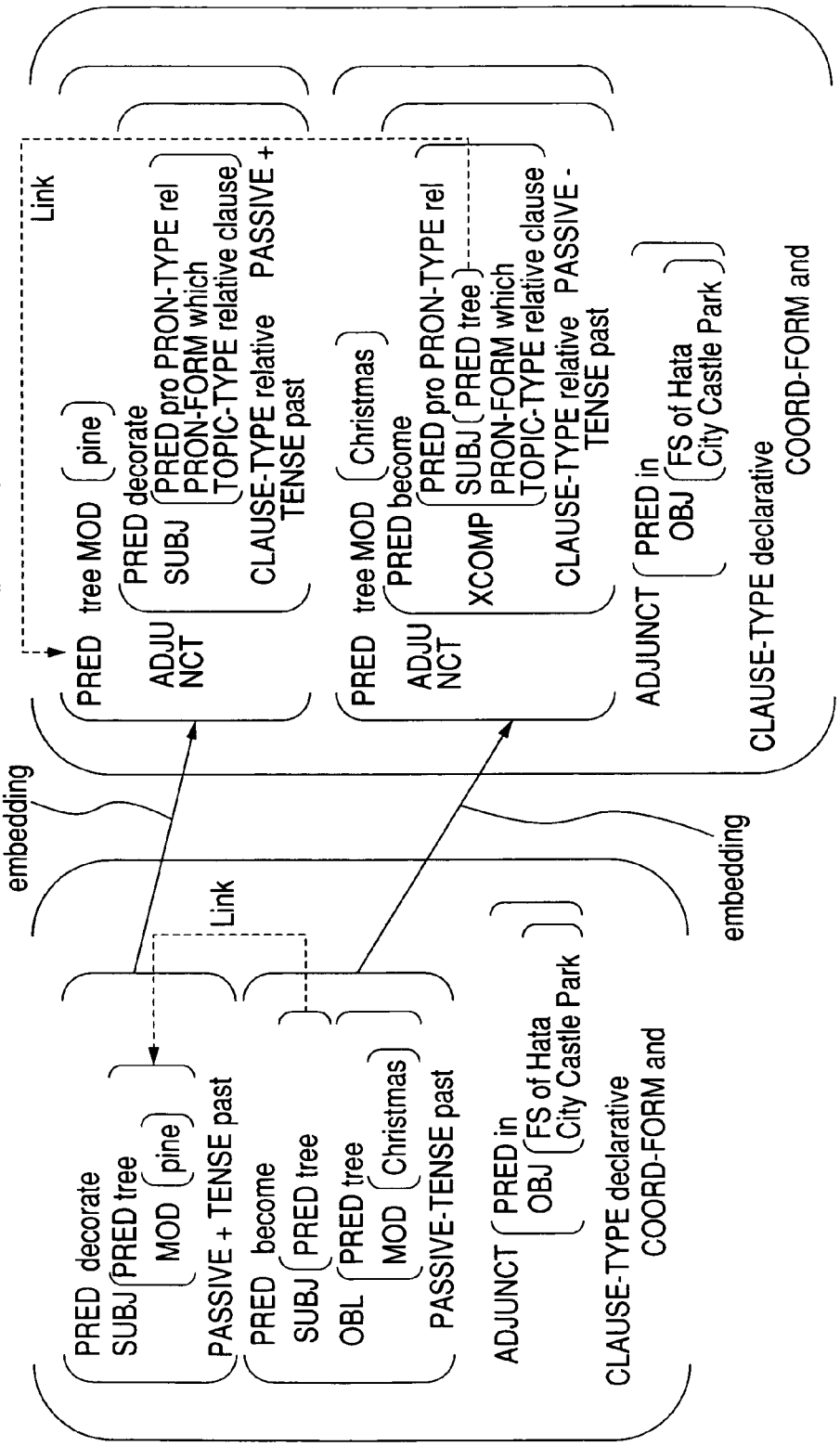
FIG. 9 is a drawing to describe syntactic and semantic structure conversion processing executed in the question answering system according to the embodiment of the invention.

As shown in FIG. 9A, "a pine tree which was decorated" is generated from
verb "decorated", and
subjective case "pine tree".

Furthermore, "a Christmas tree which (a pine tree) became" is obtained from
verb "became",
subject case "pine tree" and
adjunct phrase "a Christmas tree".

Based on these results, a relative clause sentence "In Hata City Castle Ruin Park in which preparations for the year change period started at the 20th of December, the pine tree which was decorated and a Christmas tree which (the pine tree) became" is generated from the sentence 2.

In the syntactic and semantic structure, the portion between parentheses indicates a portion "pine tree", which appears previously. Also, the above-described sentence is obtained from the syntactic and semantic structure to which an operation is applied, and grammatical matters are not required here.

This relative clause sentence is generated based on sentence 2 generated by integrating sentences 1 and 2 described above, namely, sentence 2:

In Hata City Castle Ruin Park in which preparations for the year change period started at the 20th of December, a pine tree was decorated and became a Christmas tree.

Figure 9B:
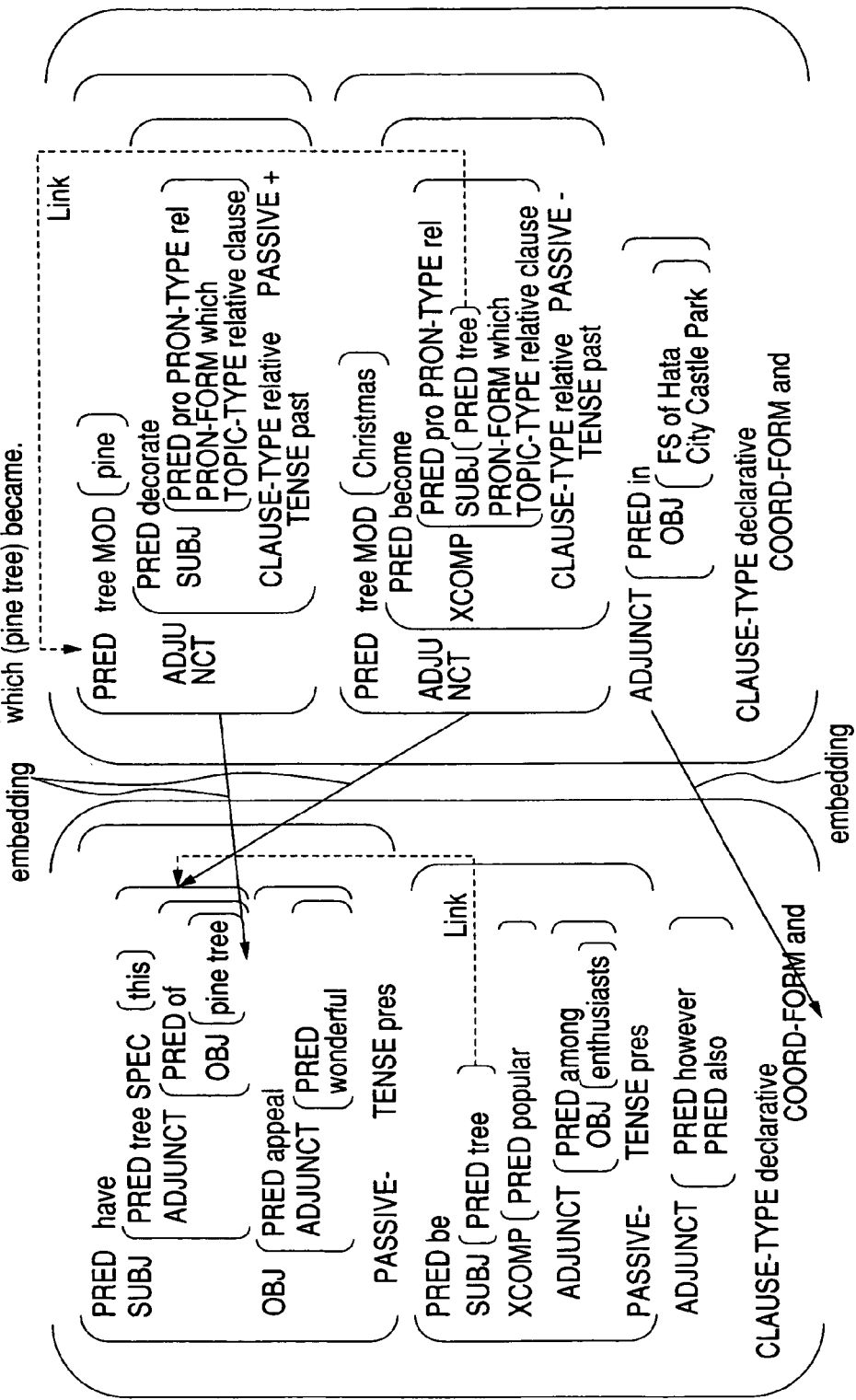

As shown in FIG. 9B, this relative clause sentence is embedded into:

Sentence 5:

However, this tree of the pine tree also has a wonderful appeal and is popular among enthusiasts.

Figure 9C:
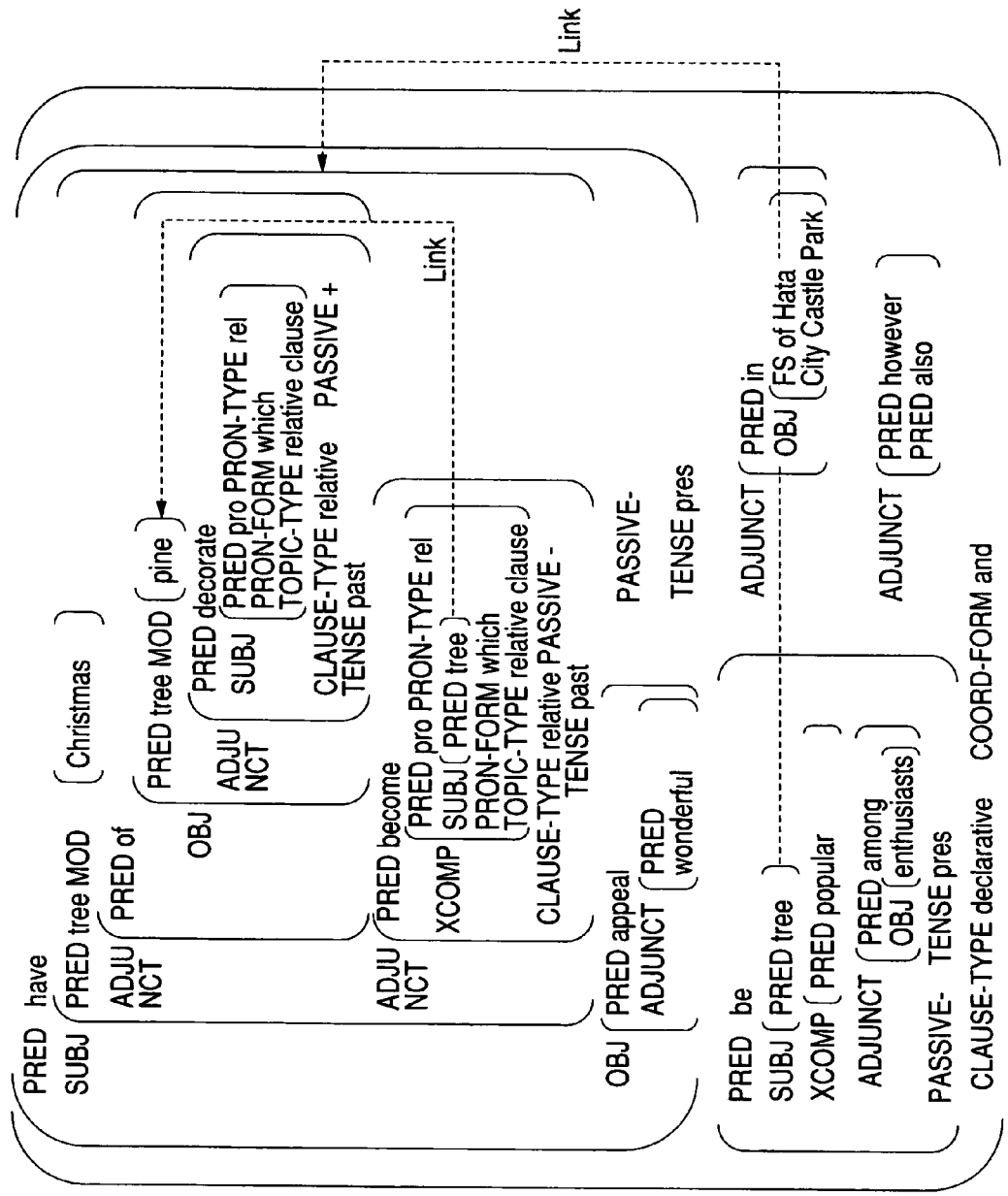
Figure 9D:
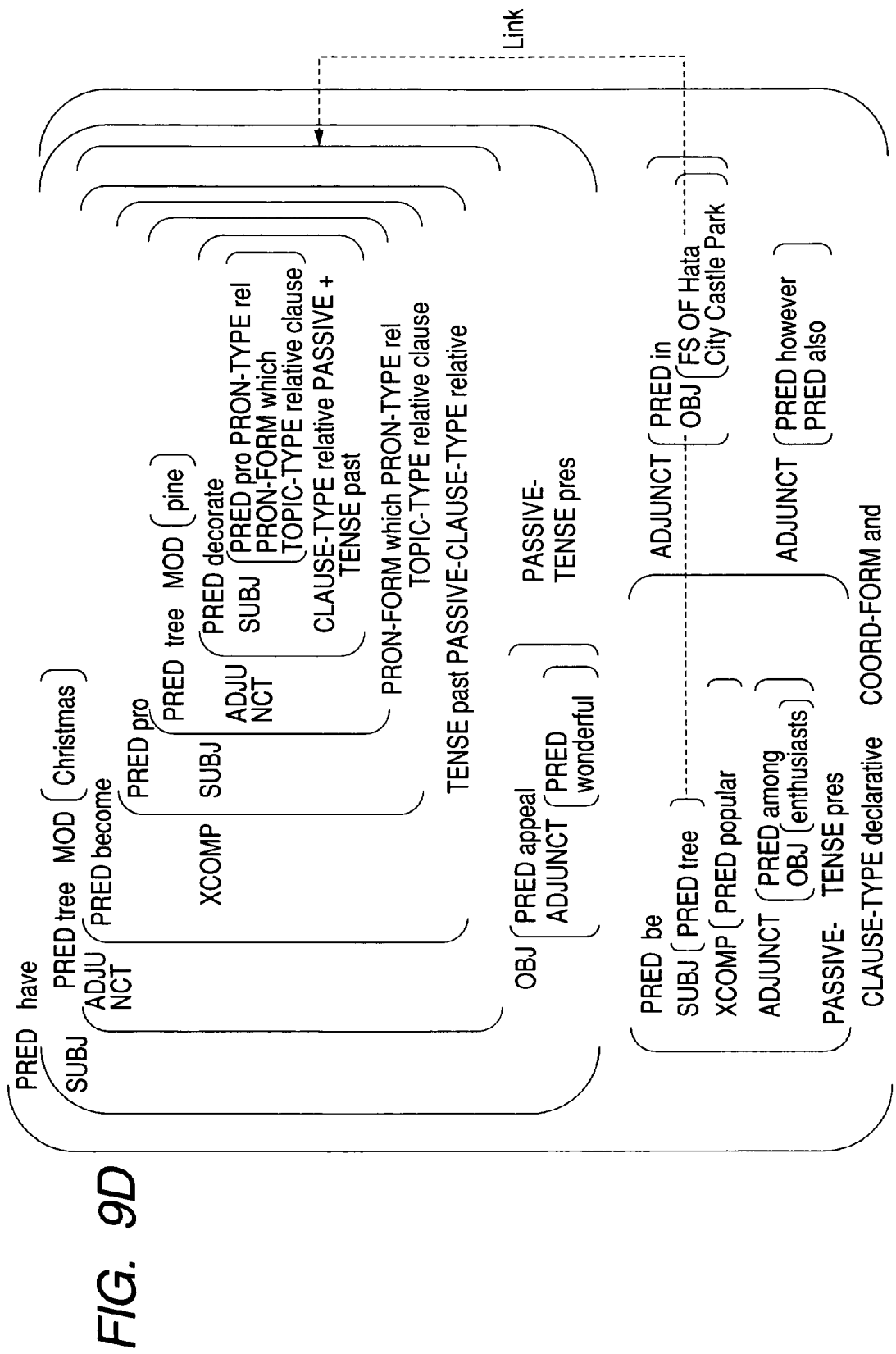

As a result of the embedding processing, the syntactic and semantic structure shown in FIG. 9C is obtained and integrated sentence:

"However, in Hata City Castle Ruin Park in which preparations for the year change period started at the 20th of December, a Christmas tree of the pine tree which was decorated, which (the pine tree) became, also has wonderful appeal and is popular among enthusiasts".

is obtained. Also, although "pine tree" appears in "which the pine tree became" and "the pine tree which was decorated" both included in the integrated sentence derive from the single portion "pine tree" in the sentence 2, the single portion "pine tree" is changed into the two modification clauses, which overlap. When these portions are further integrated, finally the following single integrated sentence can be obtained as shown in FIG. 9D.

"However, in Hata City Castle Ruin Park in which preparations for the year change period started at the 20th of December, a Christmas tree which the pine tree, which was decorated became, also has wonderful appeal and is popular among enthusiasts".

This sentence is generated by integrating and collecting the three sentences:

Sentence 1:

Preparations for the year change period started at the 20th of December in Hata City Castle Ruin Park.

Sentence 2:

In the park, a pine tree was decorated and became a Christmas tree.

Sentence 5:

However, this tree of the pine tree also has a wonderful appeal and is popular among enthusiasts.

The new sentence 5 (integrated sentence) thus generated based on sentences 1, 2, and 5 and the sentences preceding and following sentences 1, 2, and 5 are set as a candidate sentence and answer candidates are provided. Considering that sentences preceding and following the places where the sentences used to generate the integrated sentence exist are contained as the candidate sentence, the candidate sentences become as follows:

Sentence 3:

Generally, a fir tree is used as a Christmas tree.

Sentence 4:

A giant Christmas tree of Rockefeller Center in New York is world-famous.

Sentence 5:

However, a Christmas tree that a decorated pine tree became in Hata City Castle Ruin Park in which preparations for the year change period started at the 20th of December also has a wonderful appeal and is popular among enthusiasts.

Answer candidate extraction processing applied to these candidate sentences is executed in a similar manner to that in the example described above, and answer candidates "New York," "Rockefeller Center," and "Hata City Castle Ruin Park" are obtained as the noun phrases each indicating a place. As the subsequent processing, score calculation similar to that described above in the example is executed and consequently "Hata City Castle Ruin Park" is obtained as the answer having the highest priority.

According to the processing example, a right answer can be obtained from a complicated context article. In addition, when a ground sentence from which the answer to the question is obtained is output, one sentence generated based on the result of the anaphoric analysis can be presented to the user, thereby enabling the user to save time and trouble for reading complicated text.

Last, a hardware configuration example of an information processing apparatus implementing the question answering system for executing the processing described above will be discussed with reference to FIG. 10. A CPU (Central Processing Unit) 501 executes processing corresponding to an OS (Operating System) and executes the search word (keyword) extraction, the search processing, the anaphoric analysis processing, the reference relation sentence extraction processing, the answer candidate extraction passage determination processing, the answer candidate extraction processing, the score calculation processing of the answer candidates, etc., based on the input question described above in the example. The CPU 501 executes the processing in accordance with a computer program stored in a data storage section of ROM, a hard disk, etc., of each information processing apparatus.

ROM (Read-Only Memory) 502 stores the program, operation parameters, etc., used by the CPU 501. RAM (Random Access Memory) 503 stores a program used in execution of the CPU 501, parameters, etc., changed whenever necessary in the execution of the CPU 501. They are connected by a host bus 504 implemented as a CPU bus, etc.

The host bus 504 is connected to an external bus 506 of a PCI (Peripheral Component Interconnect/Interface) bus, etc., via a bridge 505.

A keyboard 508 and a pointing device 509 are input devices operated by the user. A display 510 is implemented as a liquid crystal display, a CRT (cathode ray tube), or the like for displaying various pieces of information as text or an image.

An HDD (Hard Disk Drive) 511 contains a hard disk and drives the hard disk for recording or reproducing (playing back) a program executed by the CPU 501 and information. The hard disk is used as answer candidate, search result, and passage storage means, etc., for example, and further stores various computer programs such as a data processing program.

A drive 512 reads data or a program recorded on a removable record medium 521 such as a magnetic disk, an optical disk, a magneto-optical disk, or semiconductor memory mounted, and supplies the data or the program to the RAM 503 connected via the interface 507, the external bus 506, the bridge 505, and the host bus 504.

A connection port 514 is a port for connecting an external connection machine 522 and has a connection section of USB, IEEE 1394, etc. The connection port 514 is connected to the CPU 501, etc., via the interface 507, the external bus 506, the bridge 505, the host bus 504, etc. A communication section 515 is connected to a network for executing communications with a client and a network connection server.

The hardware configuration example of the information processing apparatus applied as the question answering system shown in FIG. 10 is an example of an apparatus incorporating a PC and the question answering system of the invention is not limited to the configuration shown in FIG. 10 and may have any configuration if the configuration has the capability of executing the processing described above in the examples.

While the invention has been described in detail in its preferred embodiment (examples), it is to be understood that modifications will be apparent to those skilled in the art without departing from the spirit and the scope of the invention. That is, the invention is disclosed for illustrative purposes only and it is to be understood that the invention is not limited to the specific embodiment (examples) thereof except as defined in the claims.

The processing sequence described in the specification can be executed by both or either of hardware and software. To execute software processing, the program recording the processing sequence can be installed in memory in a computer incorporated in dedicated hardware for execution or can be installed in a general-purpose computer that can execute various types of processing for execution.

For example, the program can be previously recorded on a hard disk or in ROM (Read-Only Memory) as a record medium or can be stored (recorded) temporarily or permanently on a removable record medium such as a flexible disk, a CD-ROM (Compact Disk Read-Only Memory), an MO (Magneto Optical) disk, a DVD (Digital Versatile Disk), a magnetic disk, or semiconductor memory. Such a removable record medium can be provided as a package software product.

The program not only can be installed in a computer from a removable record medium as described above, but also can be transferred by radio waves from a download site to a computer or can be transferred to a computer in a wired manner through a network such as the Internet for the computer to receive the program thus transferred and install the program on a record medium such as a hard disk incorporated.

The various types of processing described in the specification may be executed not only in time sequence according to the description, but also in parallel or individually in response to the processing capability of the apparatus for executing the processing or as required. The system in the specification is a logical set made up of a plurality of units (apparatus) and is not limited to a set of units (apparatus) housed in a single cabinet.

According to the configuration described in each example, for example, even if a candidate sentence is selected from among a search result on the basis of a match degree with a search keyword, it is possible to reliably acquire a potent answer candidate located at a position distant from the keyword without overlooking it and to present the potent answer candidate to a user.

What is claimed is:

1. A question answering system comprising:
   a CPU;
   a question input unit that inputs a question;
   a search unit that executes search processing based on the input question;
   an anaphoric analysis unit that executes anaphoric analysis processing on a search result of the search unit;
   an information extraction unit that extracts sentences, which include expressions having a reference relation therebetween, as reference relation sentences, the reference relation determined by finding an anaphoric relation between a first expression and a second expression of at least one of a noun phrase, a pronoun, and a zero pronoun between respective sentences in the search result based on a result of the anaphoric analysis executed by the anaphoric analysis unit, wherein
   the information extraction unit selects a first candidate sentence containing the first expression from a passage obtained as the search result, and selects a second candidate sentence containing the second expression, which is a reference relation sentence of the first candidate sentence; and
   the information extraction unit selects as the first candidate sentence from the passage obtained as the search result, a sentence containing more words corresponding to a search keyword used by the search unit and another sentence adjacent thereto; and
   if a reference relation sentence of the selected first candidate sentence is present, the information extraction unit selects the reference relation sentence of the selected first candidate sentence as the second candidate sentence; and
   an answer candidate extraction unit that extracts an answer candidate from the first and second candidate sentences selected by the information extraction unit.

2. The question answering system according to claim 1, further comprising:
   an answer selection unit that calculates a score of the extracted answer candidate indicating suitability degree as an answer to the input question.

3. The question answering system according to claim 2, wherein:
   the answer selection unit calculates a first score value of the answer candidate on a basis of number of words, which correspond to the search word and are contained in at least one of a sentence containing the answer candidate and a sentence adjacent to the sentence containing the answer candidate,
   the answer selection unit calculates a second score value of the answer candidate on a basis of number of words, which correspond to the search word and are contained in at least one of a sentence containing the answer candidate and a reference relation sentence of a sentence adjacent to the sentence containing the answer candidate, and
   the answer selection unit calculates the score of the answer candidate on a basis of the first and second score values of the answer candidate.

4. A data search method comprising:
   inputting a question;
   executing search processing based on the input question;
   executing anaphoric analysis processing on a search result;
   extracting sentences, which include expressions having a reference relation therebetween, as reference relation sentences, the reference relation determined by finding an anaphoric relation between a first expression and a second expression of at least one of a noun phrase, a pronoun, and a zero pronoun between respective sentences in the search result based on a result of the anaphoric analysis;
   selecting a first candidate sentence containing the first expression from a passage obtained as the search result;
   selecting a second candidate sentence containing the second expression, which is the reference relation sentence of the first candidate sentence containing the first expression; and
   extracting an answer candidate from the first and second candidate sentences selected, wherein
   the selecting of the first candidate sentence comprises selecting as the first candidate sentence from the passage obtained as the search result, a sentence containing more words corresponding to a search keyword used by the search unit and another sentence adjacent thereto, the selecting of the second candidate sentence comprises, if a reference relation sentence of the selected first candidate sentence is present, selecting the reference relation sentence of the selected first candidate sentence as the second candidate sentence, and a processor performs the method.

5. The data search method according to claim 4, further comprising:

calculating a score of the extracted answer candidate indicating suitability degree as an answer to the input question.

6. The data search method according to claim 5, wherein the calculating of the score comprises:

calculating a first score value of the answer candidate on a basis of number of words, which correspond to the search word and are contained in at least one of a sentence containing the answer candidate and a sentence adjacent to the sentence containing the answer candidate;

calculating a second score value of the answer candidate on a basis of number of words, which correspond to the search word and are contained in at least one of a sentence containing the answer candidate and a reference relation sentence of a sentence adjacent to the sentence containing the answer candidate; and calculating the score of the answer candidate on a basis of the first and second score values of the answer candidate.

7. A computer-readable medium storing a computer program causing a computer to execute data search processing, the data search processing comprising:

inputting a question;

executing search processing based on the input question;

executing anaphoric analysis processing on a search result;

extracting sentences, which include expressions having a reference relation therebetween, as reference relation sentences, the reference relation determined by finding an anaphoric relation between a first expression and a second expression of at least one of a noun phrase, a pronoun, and a zero pronoun between respective sentences in the search result on a basis of a result of the anaphoric analysis;

selecting a first candidate sentence containing the first expression from a passage obtained as the search result;

selecting a second candidate sentence containing the second expression, which is the reference relation sentence of the first candidate sentence containing the first expression; and extracting an answer candidate from the first and second candidate sentences wherein the selecting of the first candidate sentences comprises selecting as the first candidate sentence from the passage obtained as the search result, a sentence containing more words corresponding to a search keyword used by the search unit and another sentence adjacent thereto, and the selecting of the second candidate sentence comprises, if a reference relation sentence of the selected first candidate sentence is present, selecting the reference relation sentence of the selected first candidate sentence as the second candidate sentence.

* * * * *